US00RE39878E

(19) United States
(12) Reissued Patent
Leung et al.

(10) Patent Number: US RE39,878 E
(45) Date of Reissued Patent: Oct. 9, 2007

(54) METHOD AND APPARATUS FOR NETWORK INITIATED PARAMETER UPDATING

(75) Inventors: Athena (Yau-Fan) Leung, Plano, TX (US); Robert E. Denman, Plano, TX (US); Kevin Wambsganz, Plano, TX (US); Kim Chang, Plano, TX (US)

(73) Assignee: Nortel Networks Limited, St. Laurent, Quebec (CA)

(21) Appl. No.: 10/370,794

(22) Filed: Feb. 21, 2003

Related U.S. Patent Documents

Reissue of:
(64) Patent No.: 6,195,546
Issued: Feb. 27, 2001
Appl. No.: 09/039,010
Filed: Mar. 13, 1998

U.S. Applications:
(60) Provisional application No. 60/041,093, filed on Mar. 14, 1997.

(51) Int. Cl.
*H04Q 7/32* (2006.01)
*H04Q 7/38* (2006.01)

(52) U.S. Cl. ..... 455/419; 455/410; 455/433; 455/551; 455/560; 340/5.1

(58) Field of Classification Search ..... 455/410, 455/411, 418–420, 517, 433, 560, 435.1, 455/551, 422.1, 186.1, 414.1; 340/5.1, 5.22, 340/5.23; 380/247–249, 270; 713/168, 169, 713/170, 171
See application file for complete search history.

(56) References Cited

U.S. PATENT DOCUMENTS 5,077,790 A * 12/1991 D'Amico et al. ..... 380/249
5,153,919 A 10/1992 Reeds, III et al.
5,282,250 A * 1/1994 Dent et al. ..... 380/247
5,377,267 A * 12/1994 Suzuki et al. ..... 380/248
5,396,543 A * 3/1995 Beeson et al. ..... 455/560

(Continued)

FOREIGN PATENT DOCUMENTS

DE 4321381 * 1/1995
DE 19633919 * 6/1997

(Continued)

OTHER PUBLICATIONS

ANSI J–STD–008, Telecommunications—Personal Station—Base Station Compatibility Requirements for 1.8 to 2.0 GHz Code Division Multiple Access (CDMA) Personal Communications Systems, Nov. 1996.*

(Continued)

*Primary Examiner*—Charles N. Appiah
(74) *Attorney, Agent, or Firm*—Garlick Harrison & Markison; Bruce E. Garlick

(57) ABSTRACT

Disclosed is an apparatus for initiating an over the air parameter administration (OTAPA) of a mobile station without the need for interacting with a mobile station user. A unique service option number included with the initial page indicates to the mobile station that an update is being requested. The mobile station performs a network validation check (SPASM) before permitting the update to take place. Flags are used in the network to alert the system that an attempted update was not completed because a mobile station was not update accessible for any of several reasons. The flags cause the system to update when the mobile station next becomes update accessible. The questions raised in reexamination request No. 90/006,577, filed Mar. 25, 2003, have been considered and the results thereof are reflected in this reissue patent which constitutes the reexamination certificate required by 35 U.S.C. 307 as provided in 37 CFR 1.570(e).

8 Claims, 22 Drawing Sheets

U.S. PATENT DOCUMENTS

| | | | | | |
|---|---|---|---|---|---|
| 5,467,398 | A | * | 11/1995 | Pierce et al. | 380/44 |
| 5,513,245 | A | * | 4/1996 | Mizikovsky et al. | 455/411 |
| 5,544,245 | A | * | 8/1996 | Tsubakiyama | 713/171 |
| 5,603,084 | A | * | 2/1997 | Henry et al. | 455/419 |
| 5,722,084 | A | * | 2/1998 | Chakrin et al. | 455/551 |
| 5,737,347 | A | * | 4/1998 | Scheps et al. | 372/23 |
| 5,761,618 | A | * | 6/1998 | Lynch et al. | 455/419 |
| 5,850,444 | A | * | 12/1998 | Rune | 705/79 |
| 5,854,978 | A | * | 12/1998 | Heidari | 455/418 |
| 5,890,075 | A | * | 3/1999 | Cyr et al. | 455/560 |
| 5,930,362 | A | * | 7/1999 | Daly et al. | 380/277 |
| 5,937,347 | A | * | 8/1999 | Gordon | 455/415 |
| 5,943,425 | A | * | 8/1999 | Mizikovsky | 380/247 |
| 6,122,503 | A | * | 9/2000 | Daly | 455/419 |
| 6,151,499 | A | * | 11/2000 | Vudali et al. | 455/433 |
| 6,195,547 | B1 | * | 2/2001 | Corriveau et al. | 455/419 |
| 6,381,454 | B1 | * | 4/2002 | Tiedemann et al. | 455/419 |
| 6,408,175 | B1 | * | 6/2002 | Park | 455/411 |

FOREIGN PATENT DOCUMENTS

| | | | |
|---|---|---|---|
| EP | 0459344 | * | 12/1991 |
| EP | 0478231 | * | 4/1992 |
| EP | 0675661 | * | 10/1995 |
| EP | 0767426 | * | 10/1996 |
| WO | 96/27270 | * | 9/1996 |

OTHER PUBLICATIONS

TIA/EIA/IS–95+ TSB74—Mobile Station—Base station Compatibility Standard for Dual–mode Wideband Spread Spectrum Cellular Station + Telecommunications Systems, Feb. 1996.*

EIA/TIA—PN 2759—Cellular system: Dual–Mode Mobile Station—Base Station Compatibility Standard; Revised Letter–Ballot Version; Incorporating Changes Adopted by TR45.3 as of Jan. 1992.*

TIA/EIA Interim Standard, Cellular Radiotelecommunications Intersystem Operations; Automatic Roaming Information Flows, TIA/EIA/IS–41.3–C Telecommunications Industry Association, Feb. 1996.

TIA/EIA Interim Stardard, Over–the–Air Service Provisioning of Mobile Stations in Wideband Spread Spectrum Systems, TIA/EIA/IS–683 Telecommunications Industry Association, Feb. 1997.

Semyon (Simon) Mizikovsky; Lucent Technologies Inc. Contribution proposing modification to the IS–683 TSB for support of the Network Initiated OTASP, Feb. 1997.

* cited by examiner

METHOD AND APPARATUS FOR NETWORK INITIATED PARAMETER UPDATING

Matter enclosed in heavy brackets [ ] appears in the original patent but forms no part of this reissue specification; matter printed in italics indicates the additions made by reissue.

CLAIM OF PRIORITY

This application is a continuation-in-part of and claims the benefit of U.S. Provisional Application No. 60,041,093, filed Mar. 14, 1997.

TECHNICAL FIELD

The present invention relates in general to over-the-air parameter administration in a wireless communications network and, in particular, to network initiated communication of data using over-the-air parameter administration, whereby mobile stations may be provisioned and configured for service on a particular operator network.

BACKGROUND

With the advent of widespread use of cellular telephones and the corresponding growth of wireless subscribers for using such telephones, a need has arisen for providing services and modifying programmed information within each of the devices used by wireless subscribers. Before describing how this need has been addressed, however, a general structure of a wireless communications systems will be described. The infrastructure of a wireless communications network generally includes multiple mobile switching centers (MSCs) which provide wireless services, control, and tracking of mobile stations within a predetermined area.

The term "mobile station" (MS) as used in the remainder of this specification and the claims is intended to refer to any wireless communication device whether the device is mobile or fixed and whether used for the transmission of voice, data or facsimiles. Subscriber Unit is another term that is used in the art to describe such a device.

A home location register (HLR) is typically utilized in the infrastructure for a wireless communications network. For each MS it serves, the HLR retains a profile of information about the mobile station, including special features for which the mobile station is authorized and where the MS is currently located. A mobile station registers its location, in terms of a currently serving MSC, on its home HLR. An MSC that is currently serving a mobile station will retrieve the MS's profile from the HLR, and store the profile in a visiting location register (VLR) that is often co-located with the serving MSC.

Subsequently, when a call for a mobile station is received by a home network, the home HLR determines where to route the call. Through this method, the home network is able to transfer the call to the current visited MSC so that the mobile station receives the call even when it is not within its own home network.

In some wireless communication networks, a number assignment module (NAM) is implemented in each of the mobile stations. The NAM provides a memory for the mobile station to hold certain relevant information. That information may include a roaming list of available roaming systems, as well as certain operational parameters such as the mobile station's directory number. It should be noted that the parameters maintained in a mobile station's NAM are assigned by a service provider to control wireless network usage. Equivalent parameters in a wireline telephone network are completely under the control of the service provider and are not stored in equipment belonging to the subscriber. However, because wireless technology breaks the direct link between a mobile station and the communication network, some operational parameters must be stored in the mobile station. As a result, wireless service providers have historically accepted a loss of control over NAM parameters once initial programming is complete.

Typically, the NAM is programmed when a mobile station is first activated. For example, before a mobile station is first utilized, the NAM is programmed by the service provider to have a preselected roaming list, services, and a directory number to be associated with the mobile station itself.

When any of the network-stored parameters that were used to supply data originally programmed into the NAM are modified, those modifications must be reflected by modifying the NAM so that the mobile station may operate correctly. In such a situation, the subscribers are typically required to physically take the mobile station to a location specified by the service provider for NAM reprogramming. Alternatively, an Over-The-Air Service Provisioning (OTASP) mechanism may be used to either activate a new mobile station, modify the existing services provided to a subscriber, or update the existing operation parameters without the intervention of a third party. OTASP is defined in a telecommunication industry association (TIA) standards having designations of IS-683 and IS-725. However, the OTASP mechanism, as specified in IS-683 and IS-725, is initiated only by the subscriber. Furthermore, the OTASP mechanism may require connection to a customer service center of a service provider for interaction with a customer service representative. Thus, while OTASP sessions do not require the mobile subscriber to physically take their mobile stations to a location specified by the service provider, subscriber effort is still required to accomplish the updating process.

Additionally, with the use of the OTASP mechanism, security may become an issue. Specifically, a wireless service provider should be able to insure that the NAM is not programmed from a renegade source. In the OTASP mechanism, a service program lock (SPL) procedure is utilized. In the SPL procedure, a password is sent to the mobile station and then used to "unlock" the mobile station if the password corresponds to that stored in the mobile station. If the password does not correspond to that stored in the mobile station, the message and programming effort is rejected. However, a lock procedure, such as SPL, where a given password is transmitted over the air, is subject to unauthorized interception. Thus any over-the-air transmitted passwords or unlocking signatures may need to be altered with each transmission to lower the risk of improper usage of such passwords by unauthorized entities.

Therefore, in addition to the need to easily program a mobile station within a wireless communication network, there exists a need to insure that such programming is performed in a secure manner such that a subscriber's mobile station is not "hijacked" for unauthorized purposes. Furthermore, a need exists for a programming methodology that may be easily implemented with minimal interruption and inconvenience to the wireless subscriber.

SUMMARY OF THE INVENTION

The present invention provides a secure method and apparatus for updating operational parameters in a mobile station as initiated by the associated network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
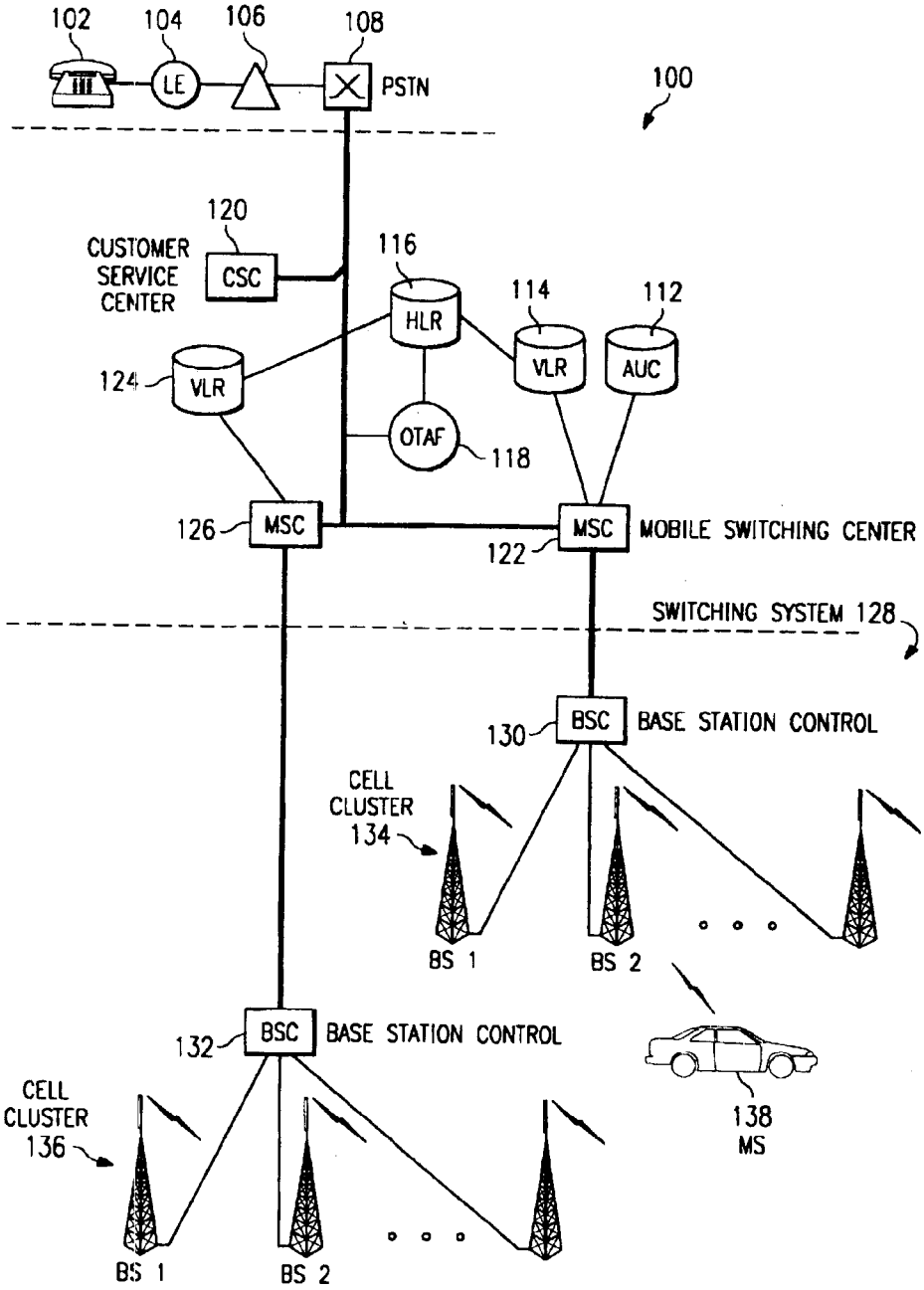
FIG. 1 illustrates, in block diagram form, a wireless communication network in accordance with one embodiment to the present invention.

The present invention sets forth a communication network and methodology for implementing an over-the-air parameter administration (OTAPA) methodology wherein a wireless communication service provider may modify service information stored within a wireless subscriber's mobile station without requiring that the subscriber be notified or take certain actions. Specifically, the OTAPA mechanism of the present invention simplifies administration of certain parameters, including values in a number assignment module (NAM), stored within a mobile station for both the service provider and the subscriber by allowing network-initiated over-the-air access to the parameters. Such access allows service providers to significantly improve customer care processes, while being totally unobtrusive to the subscriber. In addition, the present invention secures the mobile station's stored parameters from being modified by an unauthorized network.

Furthermore, the OTAPA mechanism implemented by the present invention does not require any interaction with the subscriber in order to be initiated or completed successfully. Additionally, the OTAPA mechanism of the present invention may be performed at any time the subscriber has an active mobile station, as long as the OTAPA process does not interfere with normal user operation of the device (e.g. placing or receiving telephone calls). The OTAPA mechanism of the present invention may be supported on digital channels and, optionally, on analog channels used within the communications network. Each of the functions implemented by the present invention will subsequently be described in greater detail. Prior to that description, however, a description of a typical wireless communications network in which the present invention may be implemented will be provided herein.

In the following description, numerous specific details are set forth to provide a thorough understanding of the present invention. However, it will be obvious to those skilled in the art that the present invention may be practiced without such specific details. In other instances, well-known circuits and devices have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

As will be further realized, this invention applies to a plurality of wireless access technologies. While the invention is described using code division multiple access (CDMA) terminology, the comparable terms in the other wireless technologies will be obvious to one skilled in the art. As an example, paging and access channels in CDMA terminology are designated as control channels in Advanced Mobile Phone System (AMPS) terminology.

Refer now to the drawings wherein depicted elements are not necessarily shown to scale and wherein like or similar elements are designated by the same reference numeral through the several views.

FIG. 1 illustrates a typical wireless communication system that may be used to implement the methodology of the present invention. In a communication network 100, a land line telephone 102 is coupled to a local exchange (LE) 104. The local exchange is then coupled to the public switched telephone network (PSTN) 108. The PSTN 108 is coupled to an operation center labeled customer service center (CSC) 120 and mobile switching centers (MSC) 122 and 126. The two MSC's 122 and 126 communicate with a home location register 116 through an over-the-air function (OTAF) block 118. The HLR is connected to communicate with an Authentication Center (AUC) 112 as well as with visitor location registers (VLR) 114 and 124. The VLR 114 is connected to and is used solely for visiting MSs under the purview of MSC 122 while VLR 124 is connected to MSC 126.

In the communication network of FIG. 1, mobile switching center (MSC) 122 and 126 communicate via HLR 116 with authentication center (AUC) 112 to insure that subscribers attempting to use communication network 100 are authorized to do so. It may be noted that an authentication center is also often referred to in the art and in an attached set of definitions by the acronym AC. It should be noted that all mobile station equipment used on communication network 100, whether a hand portable or vehicle-mounted phone or other wireless communication device, stores an identification number referred to as a mobile station identification (MSID). An MSID may be MIN or IMSI as defined in the attached appendix. The MSID is typically programmed into the mobile station during the activation process performed by a service provider.

During operation of communication network 100, base stations (BS) communicate data to a mobile subscriber at mobile station (MS) 138. Such base stations are typically arranged in clusters (134, 136) that are controlled using a base station controller (BSC). For example, BSC 130 controls operation of cell cluster 134 and BSC 132 controls operation of cell cluster 136. Mobile switching centers 122 and 126 are implemented to direct traffic around the network. Each mobile switching center is associated with a home location register (HLR) 116 and a visiting location register (VLR). For instance, MSC 126 is associated with VLR 124 and MSC 122 is associated with VLR 114. It should not noted that each MSC is not necessarily physically associated with a corresponding VLR.

Another network entity that is typically connected to the HLR is the over-the-air function (OTAF). OTAF is the network entity that supervises the over-the-air service provisioning upon requested by the customer service center (CSC). The OTAF receives the mobile station's updated information from the CSC and then interacts with the serving MSC to download the information to the mobile station. Standard operation of each of the elements of communication network 100 is well-known to those with skill on the art and, therefore, will not be described in greater detail herein.

The present invention implements an over-the-air parameter administration (OTAPA) methodology that allows a service provider, such as that embodied in customer service center (CSC) 120 of FIG. 1, to update certain parameters stored within a mobile subscriber such as mobile subscriber 138 of FIG. 1. The parameters to be modified may be various NAM indicators, as well as roaming lists and other information typically stored within a memory of a mobile subscriber.

In contrast to previously implemented methodologies for modifying information stored within a mobile station, the OTAPA mechanism of the present invention is a network-initiated programming procedure. The OTAPA programming procedure of the present invention uses an existing over-the-air programming protocol that supports a previously implemented OTASP feature to provide a very different network-initiated programming procedure. Furthermore, the present invention implements a mobile station parameter administration security mechanism (SPASM) that prevents an unauthorized network-initiated over-the-air programming from being performed. In the event that an MS has a plurality of NAMs, each NAM in that MS is secured separately using the SPASM protocol.

Figure 2:
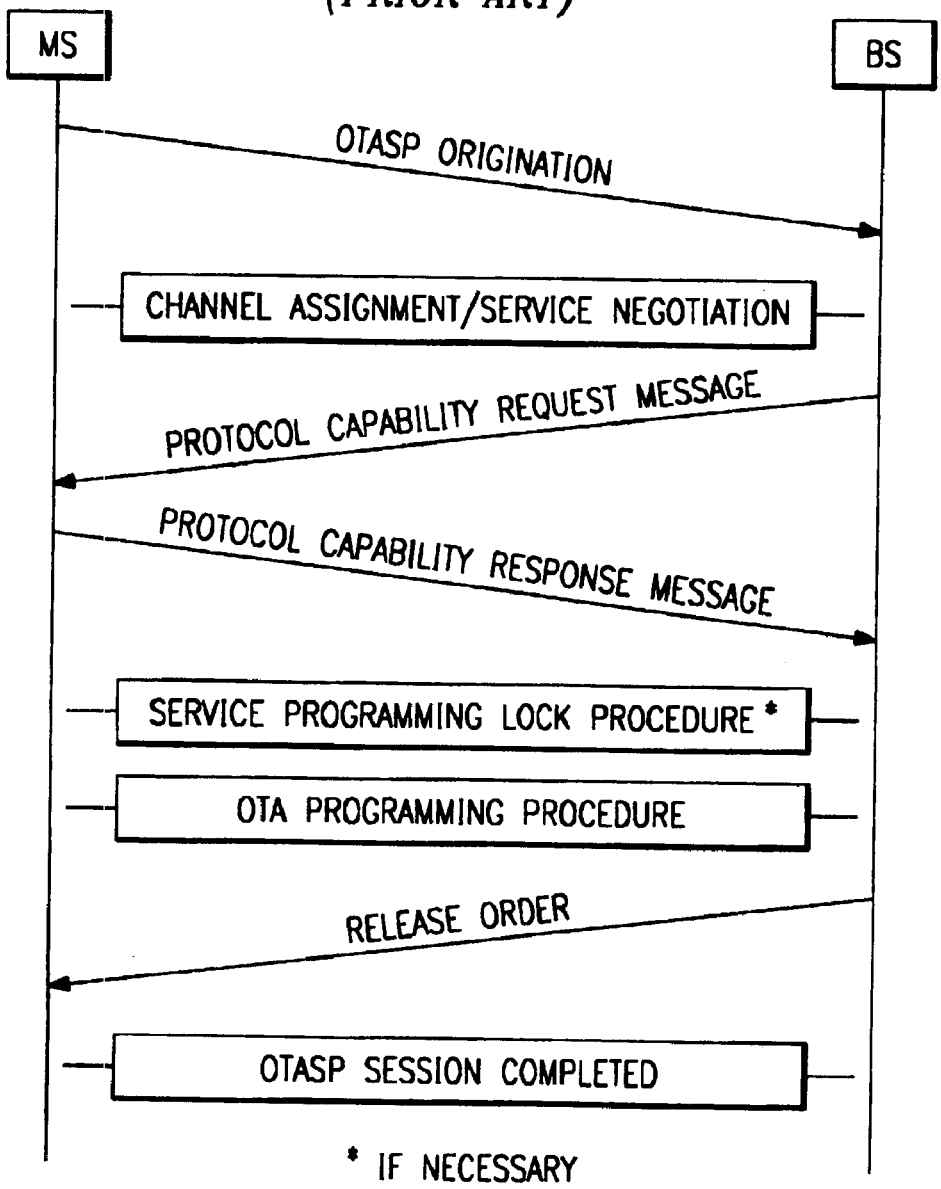
FIG. 2 (PRIOR ART)
FIG. 2 illustrates, in a time sequence diagram form, a methodology of a prior art process designated as OTASP.

To contrast the functionality of the OTAPA methodology of the present invention, a prior art OTASP methodology will be generally described. FIG. 2 illustrates a typical OTASP can flow that describes the communications made between a mobile station and a base station. In a typical prior an OTASP call flow, a mobile subscriber originates the OTASP mechanism by placing a call via a local base station to a specified service provider customer service center such as 120 in FIG. 1. Subsequently, channel assignment and service negotiation functions occur between the mobile station and the base station to form a communications channel. Such channel assignment and service negotiation functions are well-known to those with skill in the relevant art.

Subsequently, the base station may access the capability of the mobile station by sending a protocol capability request message. The protocol capability request message basically ascertains the functionality supported by the mobile station. After the mobile station provides this functionality to the base station through a protocol capability response message, a service programming lock procedure is initiated in which the wireless communication device corresponding to the mobile subscriber is "unlocked" for programming. In the lock procedures implemented by typical OTASP communication systems, the base station will send a message having a password embedded therein to the mobile station. The mobile station compares the password to an internally stored password to determine whether external programming should be allowed. Should the password be correct and over-the-air (OTA) programming be allowed, the base station will proceed to program the mobile station with the appropriate information. After the base station has finished programming the mobile station, the base station generates a release order to release the traffic channel between the mobile station and itself. The release order completes the OTASP session. The foregoing OTASP call flow illustrates a traditional prior art method used to program the mobile station.

In contrast to above-described OTASP call flow that requires third party intervention by a service provider, the present invention implements an over-the-air parameter administration (OTAPA) methodology that allows a service provider to modify information stored within a wireless communication device of a mobile subscriber without requiring any action by the subscriber. Stated another way, the OTAPA methodology of the present invention is initiated by the service provider and is virtually "transparent" to the subscriber. The methodology will subsequently be described in greater detail.

Figure 3:
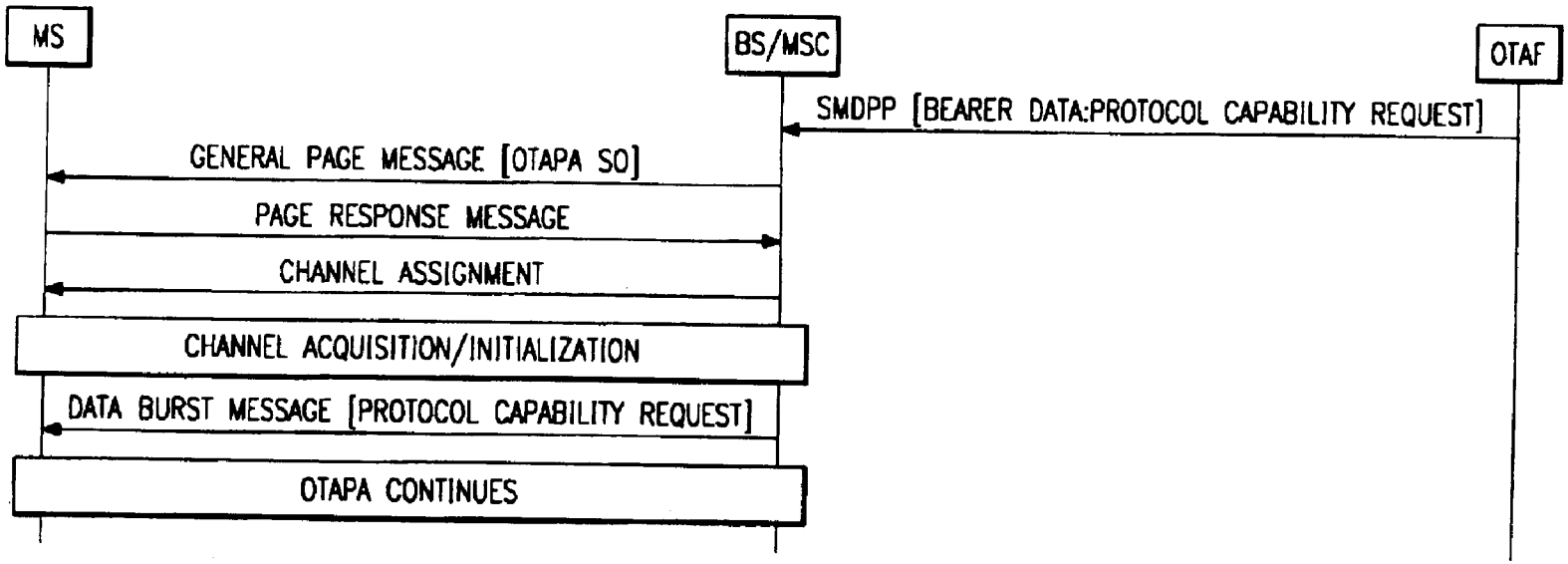
FIG. 3 illustrates, in a time sequence diagram form, a generalized methodology of the updating process implemented in accordance with one embodiment to the present invention.

In FIG. 3, an over the air function entity determines that an updating procedure is required. Typically the OTAF would be associated with the CSC of the home network of the MS such as CSC 120 and OTAF 118 of FIG. 1. A message is sent, as shown, from the OTAF to the BS presently communicating with the MS that requires updating.

If the MS is idle, a general page message is sent to the MS with a service option (SO) indicator signifying that an OTAPA update is about to be performed. Upon receipt of the message, the MS sets a SO flag so that when a channel is assigned, the MS will not bother the user by supplying an audio "ring" indication. The MS then supplies a page response message and a channel assignment message is returned. The remaining actions illustrated in this figure are set forth in more detail in later figures.

If the MS already has a traffic channel assigned and is presently communicating with another entity on the traffic channel, there is no need to set up a traffic channel and signalling traffic will be used to commence the OTAPA function with an OTA Data Message. Most digital MSs in present use have the capability of multiplexing main and signalling communications with a BS. Many BSs can communicate over primary, secondary and signalling portions of a traffic channel simultaneously in a multiplexed manner.

Figure 4:
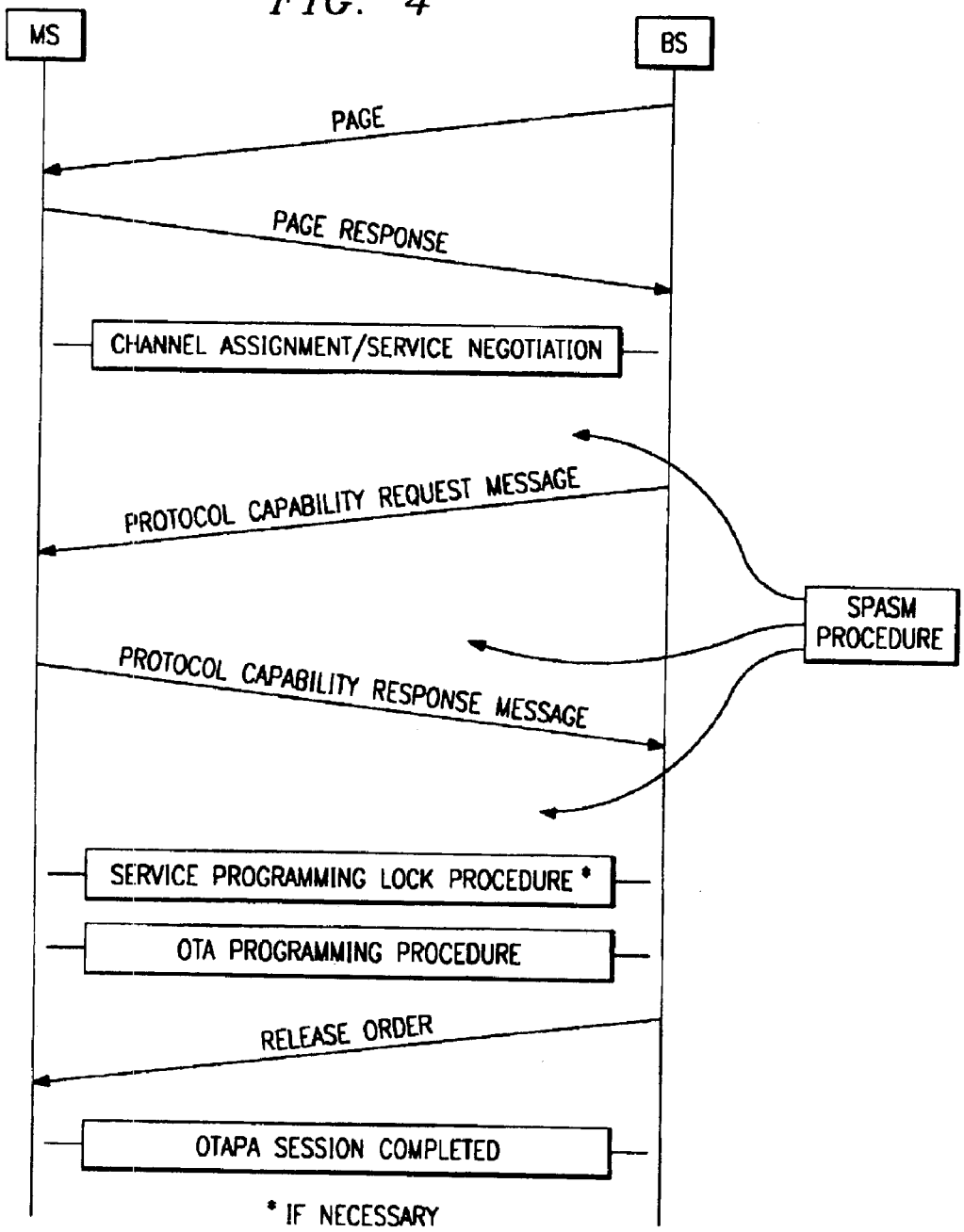
FIG. 4 illustrates, in a time sequence diagram form, a generalized methodology of the updating process implemented in accordance with one embodiment to the present invention as between the MS and a base station (BS)

In FIG. 4, the OTAPA call flow is shown in more detail than in FIG. 3 from the time when the base station pages the mobile station. The base station pages the mobile station to determine a location of the mobile station. The page response provides the base station with the mobile station's location.

Upon identifying the location of a given mobile station, the base station performs a channel assignment function in a manner similar to that used in the previously described OTASP call flow. While the channel assignment function may be similar to previously described channel assignment mechanisms, the service negotiation steps implemented by the present invention are significantly different than those previously implemented. Specifically, the present invention implements a unique service option number in the OTAPA communication protocol. Since the prior art updating with OTASP was user initiated, a regular voice service option number was used. The service option numbers and any accompanying data are communicated between the base station and the mobile station to provide detailed information about the data to be communicated. For example, the service option numbers may indicate that the data being transferred between the base station and the mobile station is data associated with one of a voice call, a data call, or a fax/video call.

By implementing service option numbers that differentiate between an OTAPA call and a normal voice call, the present invention allows service providers to modify information stored internally within a mobile station without requiring the mobile subscriber to be aware of the modifications or to require the mobile subscriber to take certain actions. Stated another way, by implementing a unique service option number for an OTAPA call, a mobile device may be designed to recognize an OTAPA call and to perform preselected steps in response thereto, wherein one of the preselected steps may be to respond to the call without alerting the user of the mobile device. A more detailed description of service option number usage will subsequently be provided.

After the mobile station responds to the unique service option number in the OTAPA call and is assigned to a traffic channel (where the system design uses a traffic channel as opposed to the use of paging channels), a protocol capability communication may be transacted between the base station and the mobile station to determine the capabilities of the mobile station. It should be noted that the protocol capability message is not required and other OTA Data Messages may be used instead to initiate the OTAPA procedure in an alternate embodiment of the OTAPA methodology of the present invention.

At this point in the OTAPA methodology, a SPASM (Subscriber Parameter Administration Security Mechanism) may be implemented. SPASM is a security mechanism that protects parameters and indicators of active NAM within the mobile station from programming by an unauthorized network entity during the duration of the OTAPA function. As illustrated in FIG. 4, the SPASM procedure may be executed either before, during or after the previously discussed capability request/response protocol is transacted. The SPASM procedure is, in a preferred embodiment, performed as part of the protocol capability communication and will subsequently be described in greater detail.

Referring again to FIG. 4, the service programming lock procedure is performed after the SPASM procedure in one embodiment of the OTASP mechanism of the present invention. As previously discussed, if a mobile device is locked by a service programming lock function, then the mobile station must be unlocked before its NAM may be programmed. In the OTAPA mechanism of the present invention, the OTA programming procedure is initiated to program the mobile station. After completion of the OTA programming procedure, the base station communicates a release command to the mobile station and the OTAPA session is completed.

The network-initiated characteristics and the SPASM protocol of the OTAPA mechanism of the present invention were generally described above. A more detailed description of each of these facets of the present invention will subsequently be described. A general list of terms and definitions used in the following discussion has been excerpted from a draft version of the TIA/EIA/IS-683-A specification entitled "Over-the-air Service Provisioning of Mobile Stations in Spread Spectrum Systems," and is attached hereto in Appendix A.

Figure 5:
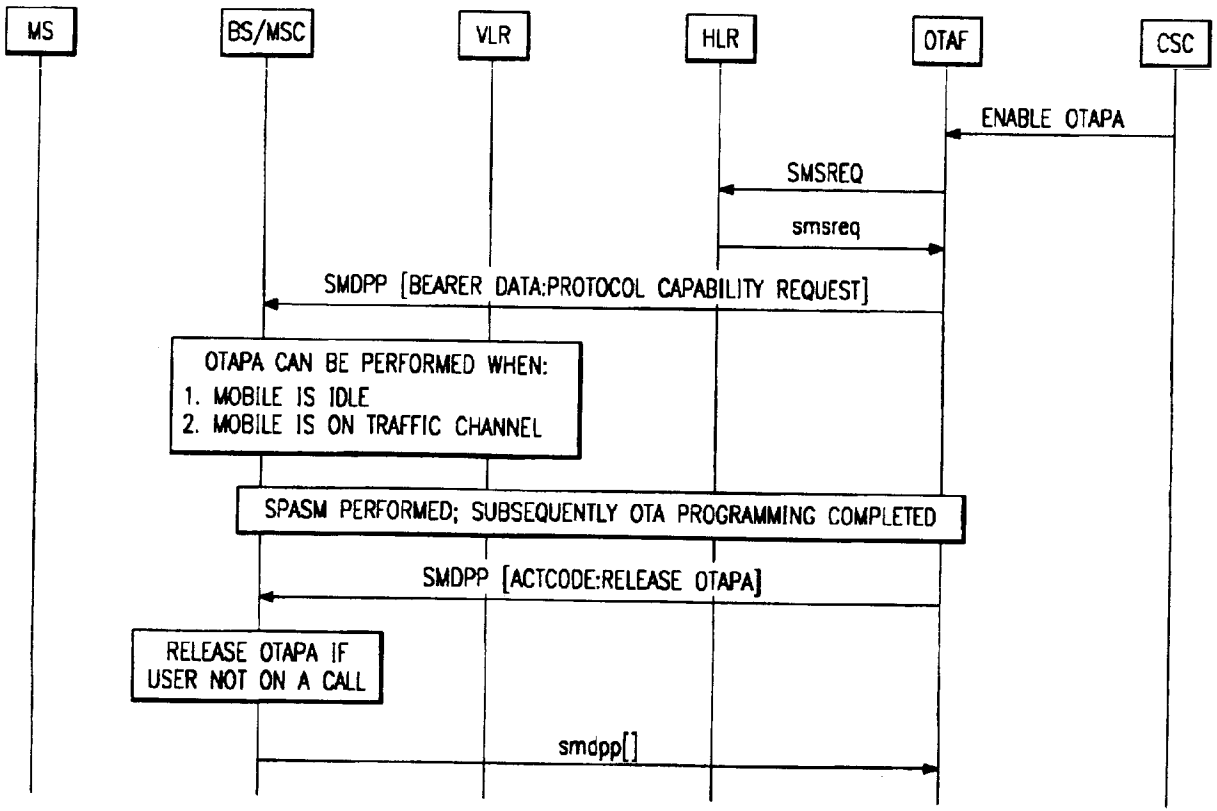
FIG. 5 illustrates, in a time sequence diagram form, a generalized methodology of the updating process implemented in accordance with one embodiment to the present invention where the MS may be visiting a foreign system.

In FIG. 5, the initiation and completion steps of an OTAPA procedure are illustrated in general. The home CSC initiates the OTAPA process by informing the OTAF that a given MS needs an update. The OTAF queries the HLR for that MSs availability and the address of the MSC in which the MS is presently (or was last) operating. This information is returned to the OTAF. As will be apparent to those skilled in the art, this invention reuses existing intersystem messages that are being used today for Short Message Service (SMS). The OTAF then forwards a request to the indicated MSC. This request includes not only the OTAPA service indicator (SRVIND) but also the OTASP data message that would have been provided in the prior art user initiated OTA process. As indicated previously, OTAPA may be performed whether the MS is idle or is being used actively on a traffic channel. Preferably SPASM is performed to validate the network attempting the update and then the OTA programming is performed to complete the updating operation.

A release message is supplied from the OTAF to the MSC/BS. If the MS user is not presently involved in an active call, the traffic channel is released. Whether or not the traffic channel is released, the MSC/BS returns a response to the OTAF indicating receipt of the release message.

Figure 6:
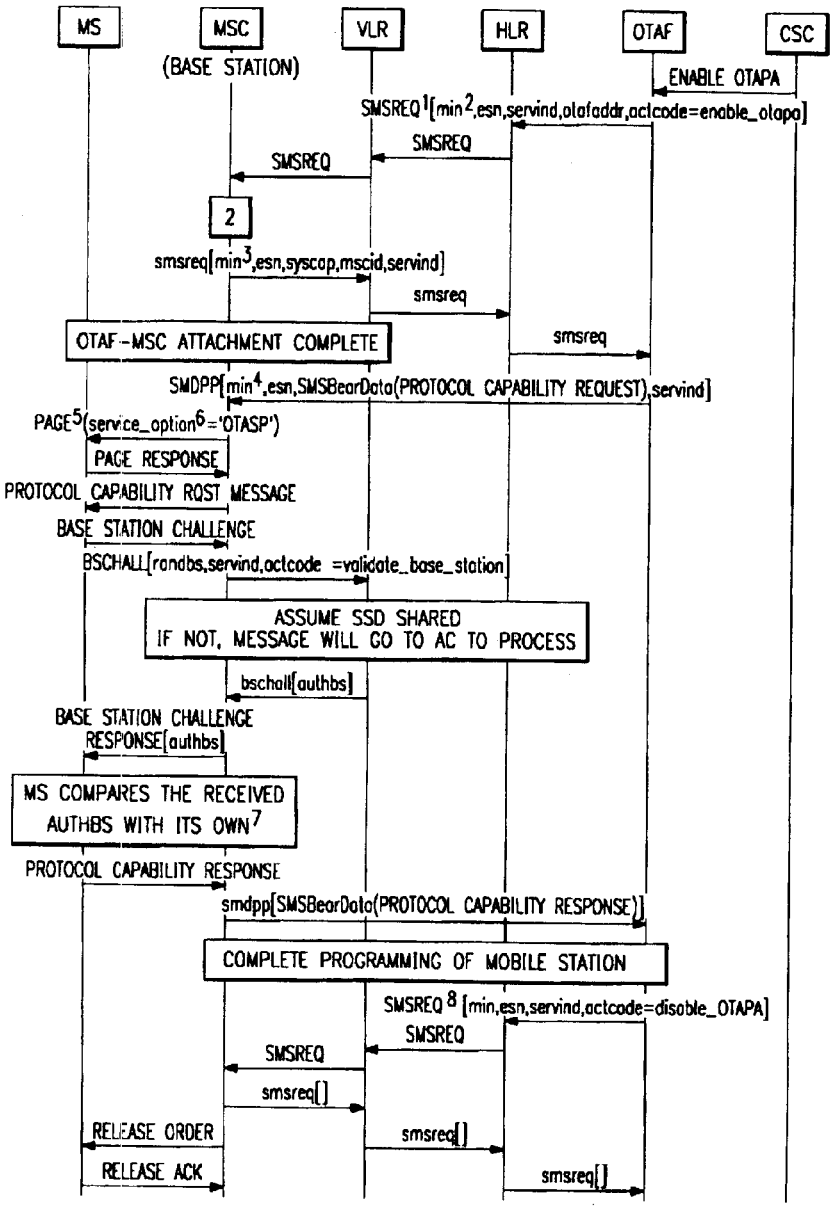
FIG. 6 illustrates, in a time sequence diagram form, a more specific methodology implemented in accordance with one embodiment to the present invention where the paging channel and the access channel are used to perform the update.

In FIG. 6, a time sequence diagram presentation illustrates in detail the steps involved in completing the OTAPA process where the MS is idle and the paging channel is used to provide the update. As shown, the CSC enables the OTAF which transmits a request to the HLR as previously shown in FIG. 5. (A superscript "1" was inserted in the figure to call attention that in various implementation this could be an OTASP notification or request as opposed to a SMS notification or request.) As will be detailed later, the HLR may set a flag indicating a pending OTAPA process and store the OTAF address in the event that the OTAPA process is not successfully completed at this time. (The superscript "2" was inserted to indicate that alternatively, the MSC could set an OTAPA pending flag and store the OTAF address, so that if programming of the mobile is not successfully completed, provisioning may be continued at a later time when notified by the MSC.) The MSC/BS returns a message as shown providing various datum including the MSs mobile station identification (MSID). (The superscripts 3 and 4 have been included to indicate that although the some of the mnemonics in the messages appear to be the same, the min[3] is for the MS's identification and the min[4] is an activation MIN. However, as is known to those in the art, these two "min"s may be identical.) Thus the OTAF may be assured that the appropriate MS was contacted. The OTAF then returns an activation MSID along with other data such that the MSC/BS will page the MS with a SO indicator that signifies that an update or OTAPA process is to be performed. (The superscript 5 is used to indicate that alternatively the base station may choose to broadcast the data burst message which contains the protocol capability request message throughout the area where the mobile is last registered. However, paging the mobile has the advantage that the MS can be authenticated to verify its identity and paging is more efficient for messages sent to an MS operating in the slotted mode. The further superscript 6 indicates that while OTASP was previously performed, there was never a service option number assigned for that function.) After the page response, a protocol capability request message is transmitted between the MSC/BS and the MS. The protocol capability request message notifies the MS of the start of the OTASP session. A network validation on the order of the previously mentioned SPASM may be performed. SPASM is initiated with the base station challenge message. As shown in FIG. 6, the Secret Shared Data (SSD) is available at the VLR. This reduces the time and cost required to complete the process. As noted in the box in this figure, if the shared secret data (SSD) is not shared, the VLR will forward the challenge via the mobile station's home HLR to the AC. SPASM will be described in more detail later.

If the MS obtains a satisfactory comparison of a returned authorization (AUTHBS) with its own internally generated AUTHBS, a satisfactory validation response message is transmitted to the OTAF as initiated by the protocol capability response message. The superscript 7 is used to indicate that a new field, result_code, should be introduced in the protocol capability response message from that previously used. If the AUTHBS received by the MS matches it own, the result_code is set to successful and the MS's protocol capability is returned in the response message. The MS would then initiate the activation procedure since this means the OTAPA process is allowed. If, on the other hand, a mismatch occurs, the result_code is set to "rejected-AUTHBS mismatch (a new result code from that previously used) and thus the request to begin a OTAPA session is ignored.

An alternative way to handle the validation failure case is simply for the MS to not return the protocol capability response message and let the OTAF time-out on the smdpp message. However, OTAF can also time-out on smdpp messages due to various IS-41 network failures. Since the action taken by OTAF may be different for these failures, it is believed more appropriate to include the result-code in the protocol capability response message as indicated in the above paragraph.

Subsequently the update programming is completed. It may be noted however that the SPL may need to be unlocked per IS-683-A specifications in order to complete the programming process.

The superscript 8 is used to indicate that since the MSC has no "knowledge" of whether programming of the MS is completed or not, OTAF must inform the MSC of the completion of the OTAPA session. The MSC can then release the OTAPA session via the release order message. If the OTAPA pending flag is set as indicated previously in this figure in conjunction with superscript 2, the MSC clears the pending flag. Alternatively, this message can be sent directly to the MSC.

The MS may now be released. It may be noted that the release order is not required if the page message mentioned in conjunction with superscript 5 is not sent.

Figure 7:
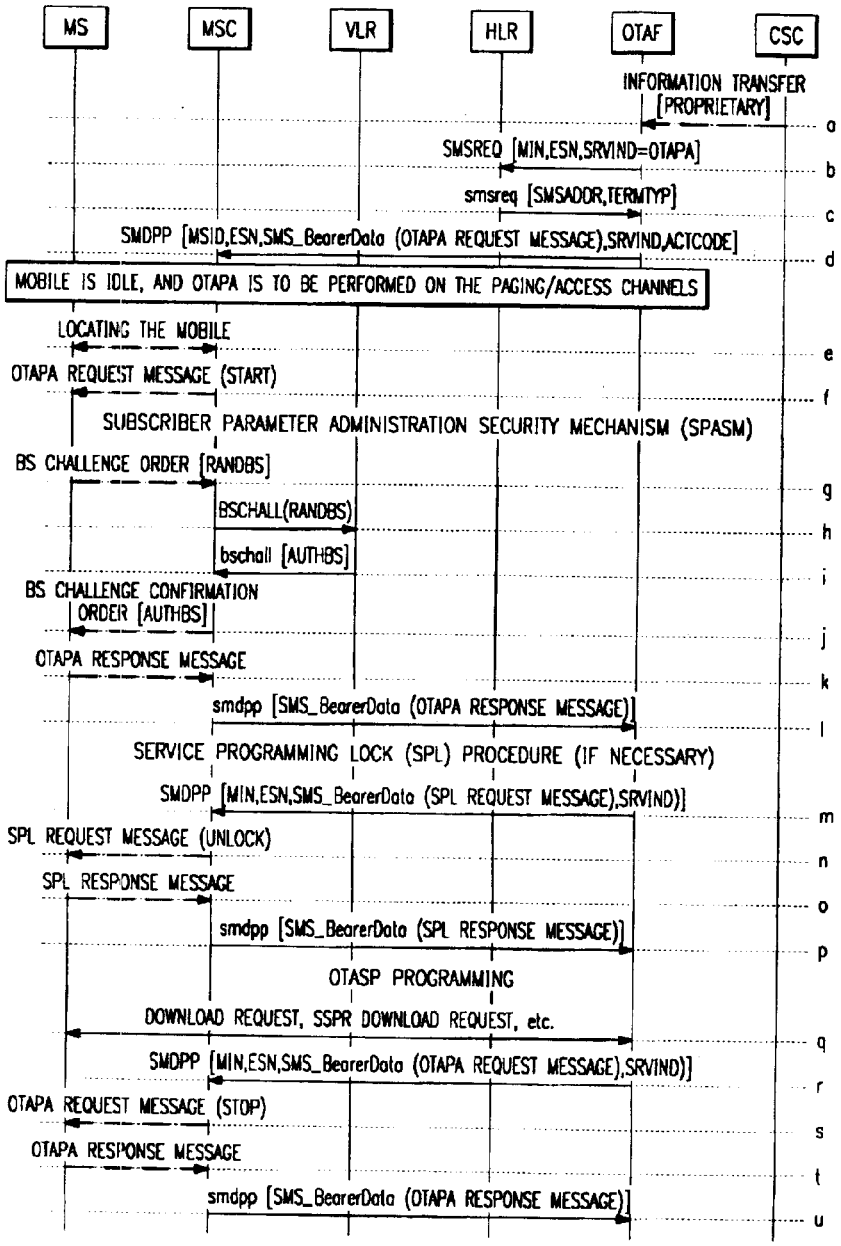
FIG. 7 illustrates, in a time sequence diagram form, a more specific methodology implemented in accordance with a further embodiment to the present invention where the paging channel and the access channel are used to perform the update.

In FIG. 7, a time sequence diagram presentation illustrates the steps involved in completing a preferred OTAPA process, alternative to that shown in FIG. 6, where the MS is idle and the paging channel is used to provide the update. The process commences as was shown in FIG. 6 when the mobile station's location information is requested by the OTAF. However, in contrast to the procedure in FIG. 6, the request is not forwarded to the serving MSC and the information is returned directly from the HLR to the OTAF. The OTAF then sends a message directly to the serving MSC whether it be a home MSC or a visited MSC. As was the case in FIG. 6, the mobile is idle and the OTAPA is to be performed using the paging/access channels. Once the mobile station is satisfactorily located by the MSC via paging, an OTAPA request message is sent from the MSC to the mobile station to initiate the OTAPA session and the SPASM process is completed in the manner shown in prior figures. If necessary, the service programming lock procedure is then completed. After the completion of these two procedures, the mobile station parameters are updated in accordance with the essence of the OTASP process as illustrated in previous figures. OTAF finalizes the OTAPA process commencing with the request message on the line having the letter designation "r". The process in completed with the response message shown on the line designated as "u".

Figure 8:
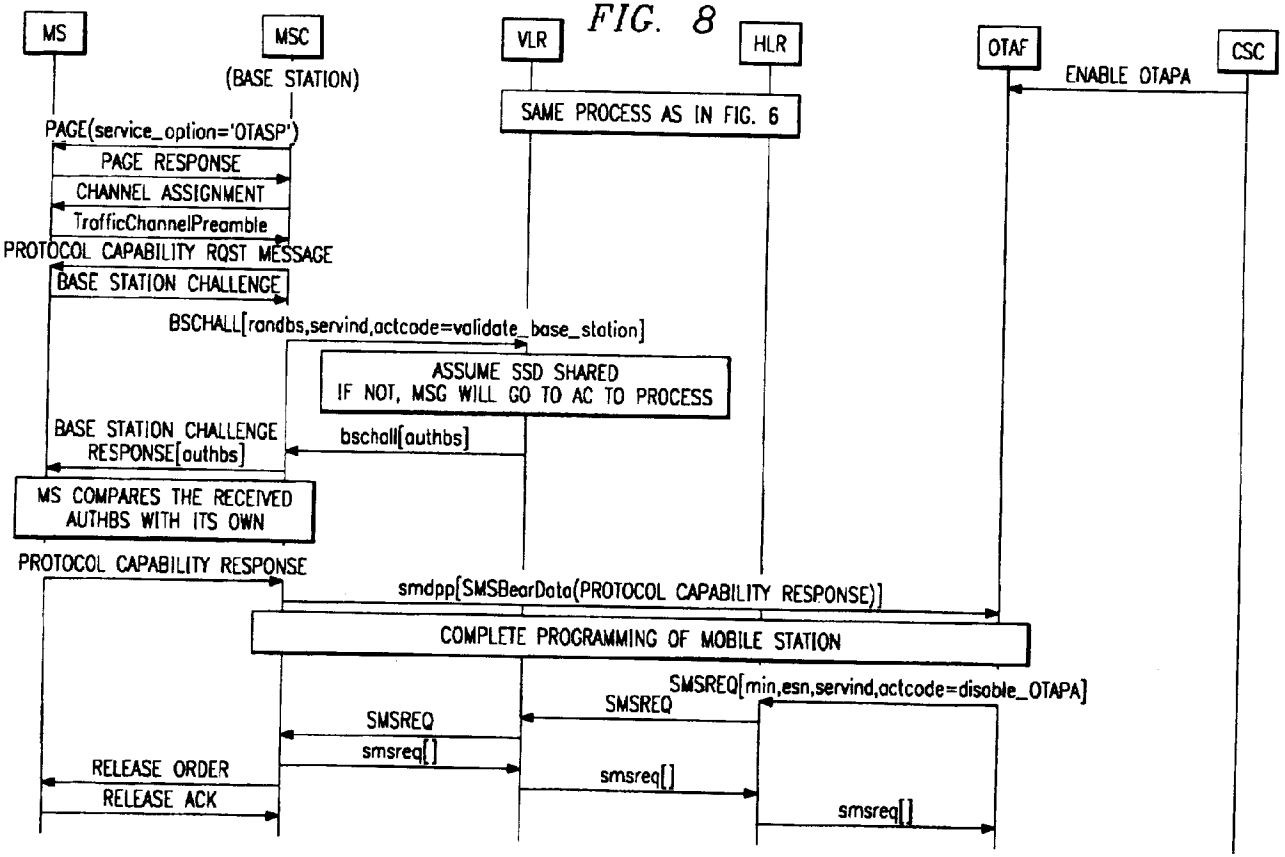
FIG. 8 illustrates, in a time sequence diagram form, a more specific methodology implemented in accordance with one embodiment to the present invention where traffic channels are used to perform the update.

In FIG. 8, the time sequence diagram shown again addresses the situation where the mobile station is idle when OTAPA is initiated. Thus a block shows that the process is the same as again FIG. 6. After the visited MSC has been contacted and a reply returned to OTAF, a page is supplied to the mobile station in a manner similar to that of FIG. 6. However, in this scenario, a traffic channel is assigned so that the OTAPA process is completed using a traffic channel rather than the paging/access process of FIG. 6. The remainder of FIG. 8 operates in substantially the identical manner as that presented in FIG. 6.

Figure 9:
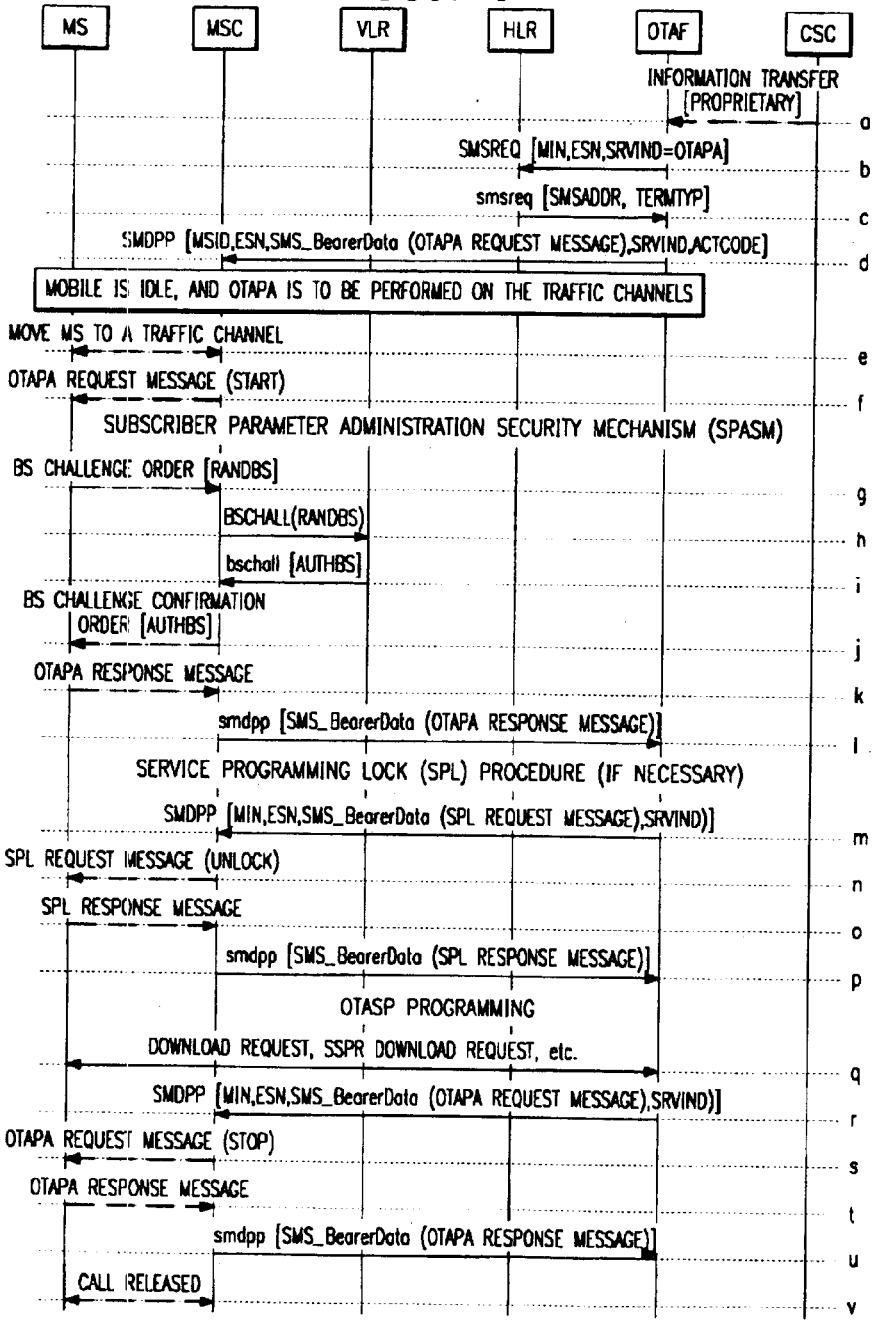
FIG. 9 illustrates, in a time sequence diagram form, a more specific methodology implemented in accordance with a further embodiment to the present invention where traffic channels are used to perform the update.

In FIG. 9, the time sequence diagram uses the traffic channel in a preferred manner alternative to that of FIG. 8 in the situation where the mobile station is idle. Thus the beginning of the process of FIG. 9 is similar to the approach used in FIG. 7. Once the OTAPA message is transmitted from the OTAF to the MSC, the mobile station is paged and moved to a traffic channel. The remainder of the procedure shown in FIG. 9 is substantially identical to the remainder of FIG. 7 in that the SPASM process, the service programming lock process and the OTASP process are all completed and the call is released.

It may be noted that one alternative way to handle the situation of a failure of the network validation process is that the mobile station simply not return the protocol capability response message. In such a situation the OTAF would timeout and know that the update had not been successfully initiated. However since the OTAF can timeout for other network failures it is believed more appropriate to provide the response message to the OTAF that the validation process has been completed in each of the FIGS. 6 through 9. It may be further noted that since the MSC does not receive data as to whether programming of the mobile station is completed or not, OTAF must inform the MSC of the completion of the OTAPA session. If an OTAPA pending flag is set in the MSC as shown at block 2 of FIG. 6, the MSC simply clears the pending flag. Otherwise, the OTAF must send a message to release as specifically shown in FIG. 6 and as implied in FIG. 7.

Figure 10:
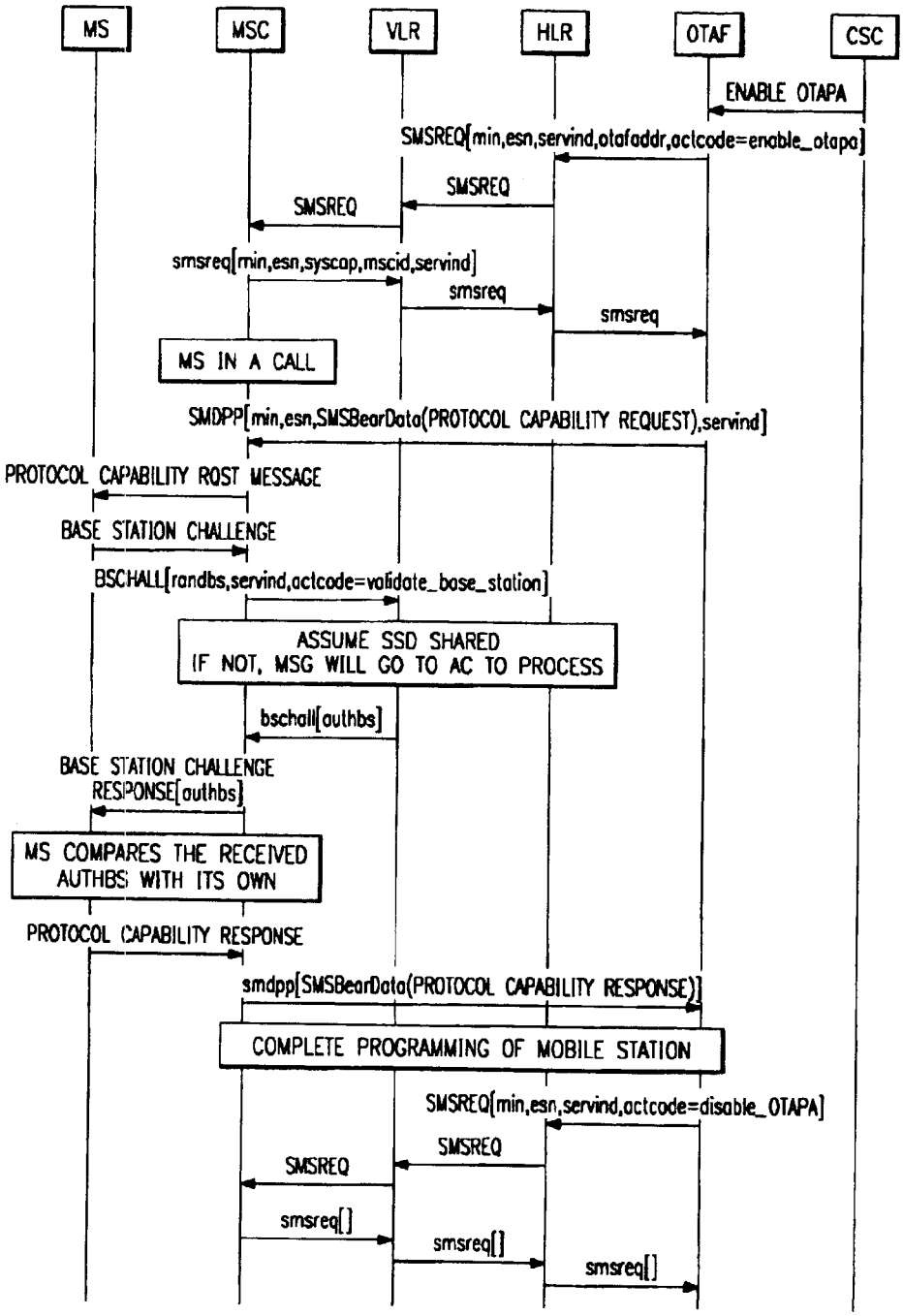
FIG. 10 illustrates, in a time sequence diagram form, a more specific methodology implemented in accordance with one embodiment to the present invention where a traffic channel is used to perform the update while the MS is on call.

In FIG. 10, a time sequence diagram is presented for use in a situation where a mobile station is processing a call on the traffic channel. The process of FIG. 10 is presented along the lines of FIGS. 6 and 8. As set forth before, the CSC enables the OTAPA process in a message to the OTAF. Messages are passed from the OTAF to the visited MSC and a reply is returned to the OTAF that the MSC has received the request. The MSC has knowledge that the mobile station is operating in a call mode and thus the MSC does not attempt to page the mobile station as set forth in FIG. 8. When the MSC receives the return message from the OTAF, it does not supply a service option indicator to the mobile station. Rather the MSC merely requests the commencement of the protocol capability process. The mobile station performs a network validation as set forth previously. If the validation process is satisfactorily completed, the mobile station is updated in the manner previously set forth in FIG. 8.

In FIG. 11, the diagram is again presented for the situation where the mobile station to be updated is already using an assigned traffic channel as was assumed in connection with FIG. 10. The OTAF, after being enabled by the CSC and after requesting data from the HLR, sends it and OTAPA request message to the visited MSC. An appropriate OTAPA request message is then transmitted from the MSC to the mobile station to commence the SPASM process. As set forth in FIG. 10, there is no need for paging the mobile with a service option indicator. The remainder of the process of FIG. 11 is substantially identical to that presented in FIG. 9 except there is no need to release the call until the call presently in progress by the mobile station user has been completed.

Figure 11:
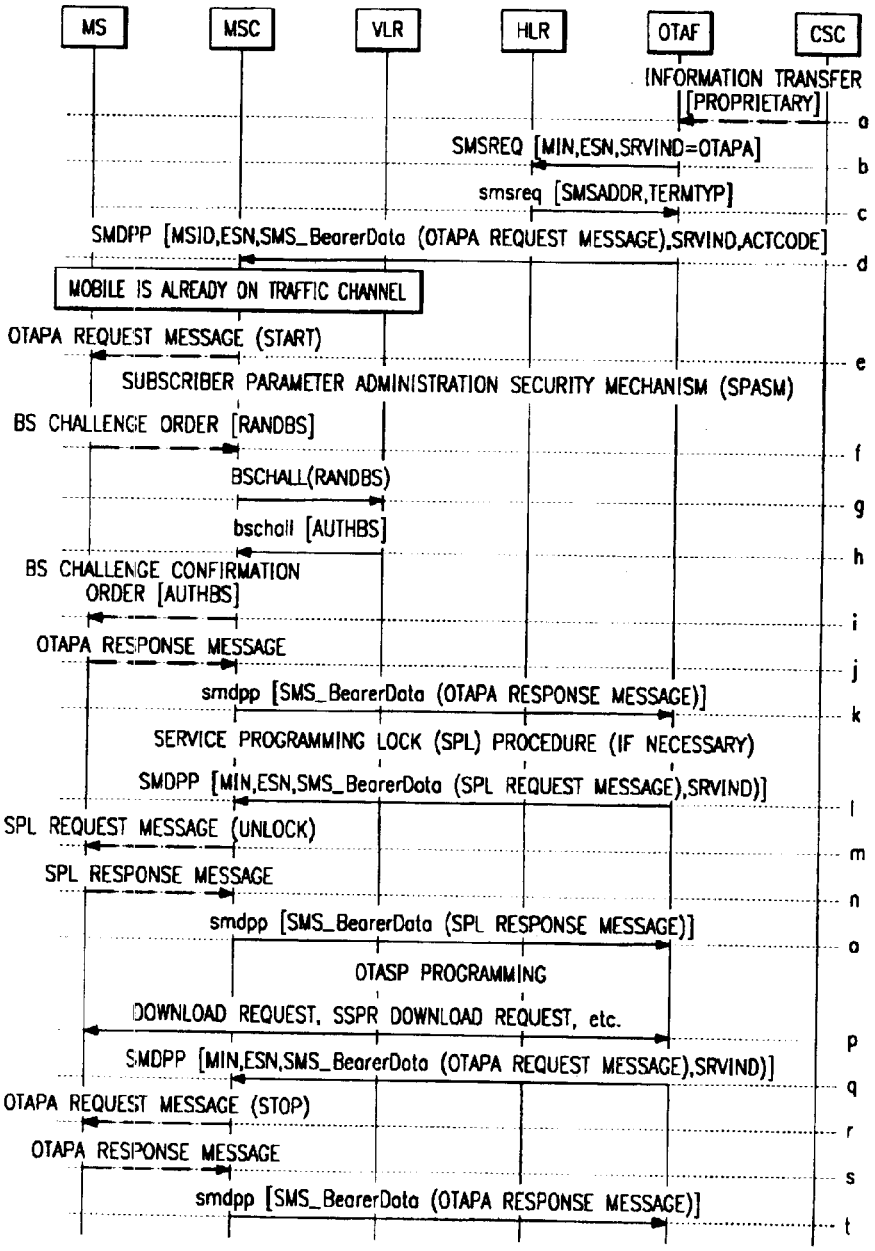
FIG. 11 illustrates, in a time sequence diagram form, a more specific methodology implemented in accordance with a further embodiment to the present invention where a traffic channel is used to perform the update while the MS is on call.

As will be apparent to those skilled in the art, in the situations of either of the processes shown in FIGS. 10 and 11, when a call is completes, the update will not be completed if the downloaded data is never committed between the mobile station and the system. In the event such a failure does occur, the lack of an OTAPA response message from the mobile station as shown near the end of FIG. 11 will cause the OTAF to timeout. The timeout of OTAF will cause it to set a flag as will be discussed later so that the OTAPA process is attempted again whereby the update process can be completed.

Figure 12:
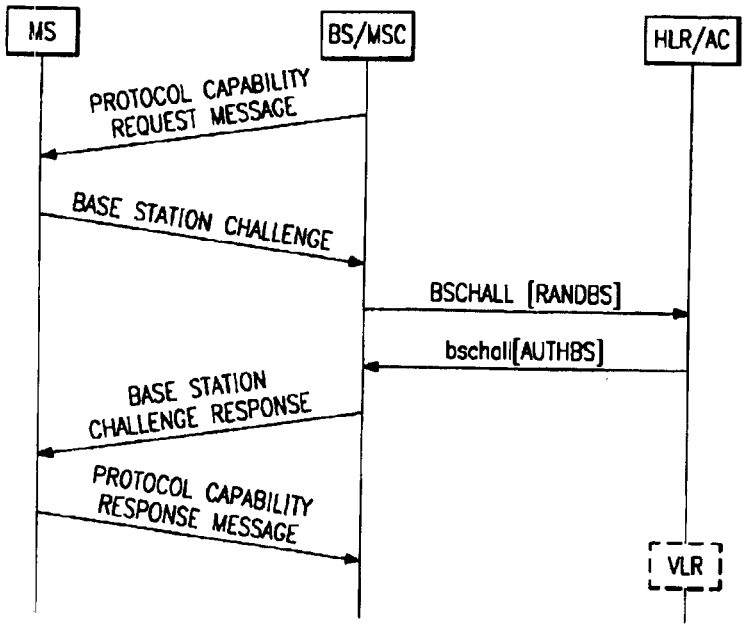
FIG. 12 illustrates, in a time sequence diagram form, a methodology of validating the network attempting to perform an update.

In a FIG. 12, a time sequence diagram presentation is provided of the network validation scheme previously labeled as SPASM. This process is referenced in at least previous FIGS. 4, 5, 9 and 11. When the mobile station determines that an OTAPA session is being initiated, the mobile station challenges the system via base station challenge. This base station challenge is forwarded to another entity to compute the authorization signature (AUTHBS) based on a secret word, preferably the secret shared data (SSD), appropriate to the mobile station which is normally stored in the home AC. The base station challenge, BSCHALL, in various embodiments, may be processed at the visiting location register, an OTAF or an AC depending on how the system is implemented, whether or not the visited network can be trusted by the home network, and where the secret word is available. Thus this figure shows HLR/AC in a solid box and a VLR in a dash line box to illustrate some variations of the concept. Once the validate signature is computed based on the secret word, it is returned to the base station which issues a response to the mobile station. Once the mobile station compares an internally generated signature with the received signature it provides an appropriate response to the base station.

Figure 13:
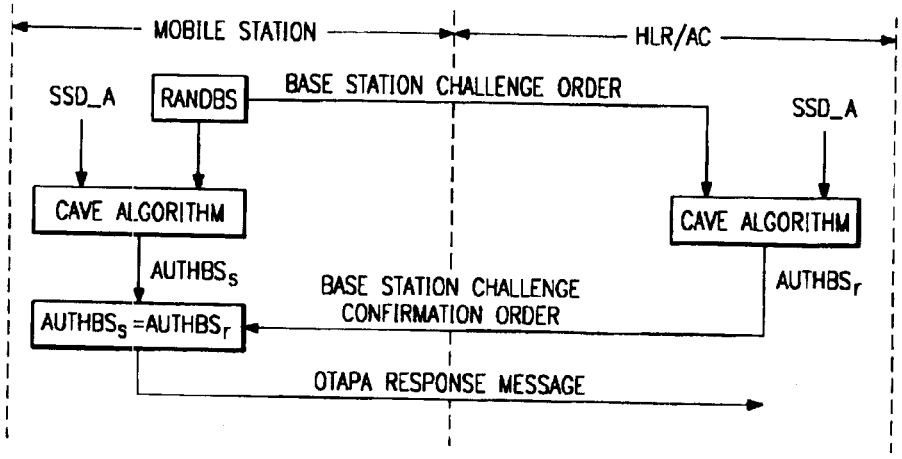
FIG. 13 illustrates, in flow chart form, one embodiment of a network validation process used in the present invention.

Although the SPASM process can be performed in various degrees of complexity, the flow diagram of FIG. 13, presents the concept in simplified terms. A signature is computed based on a secret word stored within the mobile station, preferably the SSD, and a randomly generated number, using a previously known CAVE algorithm. This random number is supplied to a network entity, preferably the home AC, for processing. As illustrated in FIG. 13, since the secret word (SSD) is also available at the AC, a signature can be generated with the received random number in an identical algorithm. The generated signature may then be returned as part of the base station challenge confirmation order. If the signature generated within the mobile station is identical with the generated signature returned by the AC, mobile station can assume that this is a valid network request. Subsequently, a trigger causes the initiation of the OTAPA process such as a protocol capability response (not shown) or the appropriate OTAPA response message is supplied to the entity requesting the OTAPA process. The simple validation process shown in FIG. 13 may be made even more secure by first combining the secret word with further data known only to the AC before performing the CAVE process. It should be noted that the SSD used in FIG. 13 can be substituted, in other embodiments, with another secret word that is only known to the mobile station and the AC.

Figure 14:
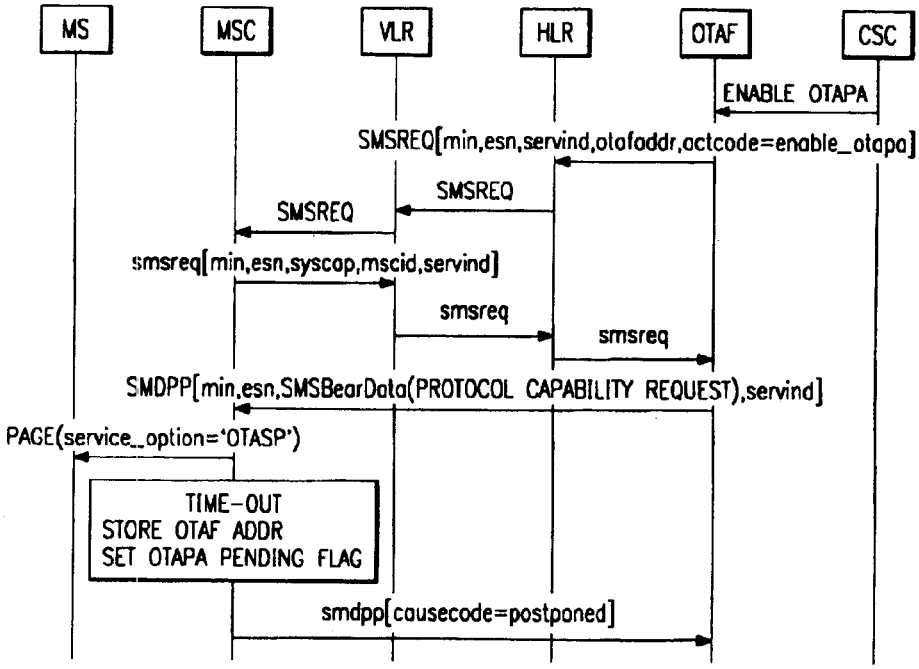
FIG. 14 illustrates, in a time sequence diagram form, a methodology implemented in accordance with one embodiment of the present invention when a mobile station cannot be located.

As will be apparent to those skilled in the art, occasions will rise when the OTAPA process is initiated and the mobile station cannot be contacted for some reason or another. In FIG. 14, the time sequence diagram is presented setting forth the actions taken by the various entities involved. After the OTAF has completed the OTAPA request to the MSC, received a reply and then has returned a response to the MSC as set forth in either FIG. 6 or FIG. 7, the MSC will ascertain it has waited too long. In the words or art, it will "timeout". As illustrated in this FIG. 14, the MSC stores the address of the OTAF and sets an OTAPA pending flag. The MSC then sends (returns) a "postponed" message to the OTAF. As it will be ascertained from figures to be yet discussed, if the MSC does not contact the mobile station within a predetermined time, the OTAF will be modified to store the OTAPA pending flag and the stored information will be cleared from the MSC register.

Figure 15:
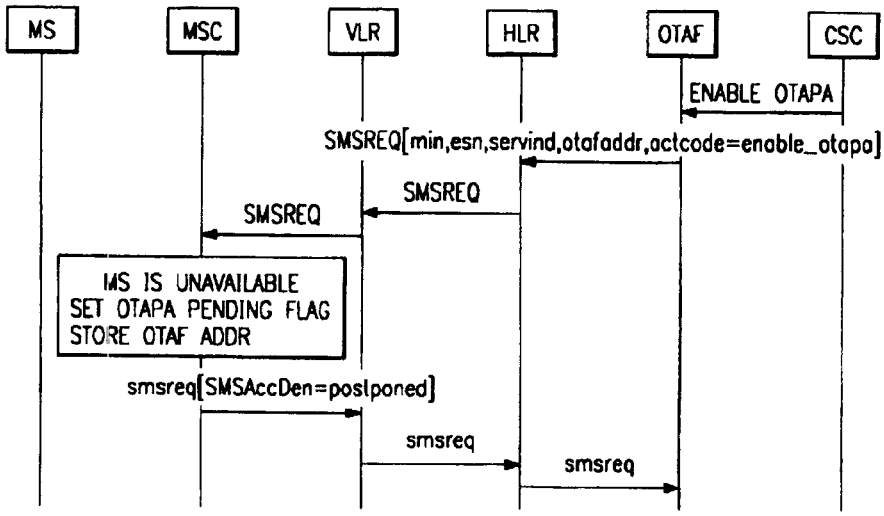
FIG. 15 illustrates, in a time sequence diagram form, a methodology implemented in accordance with one embodiment of the present invention when a mobile station is unavailable.

In a FIG. 15, a slightly different scenario is addressed. In this figure the situation occurring that needs to be addressed is that the mobile station is unavailable for some reason such as it has not recently been in contact with the MSC. Typically the MSC will have attempted a page in the recent past and has been unsuccessful. As shown, the pending flag is set and the OTAF address is stored as occurred in FIG. 14.

Figure 16:
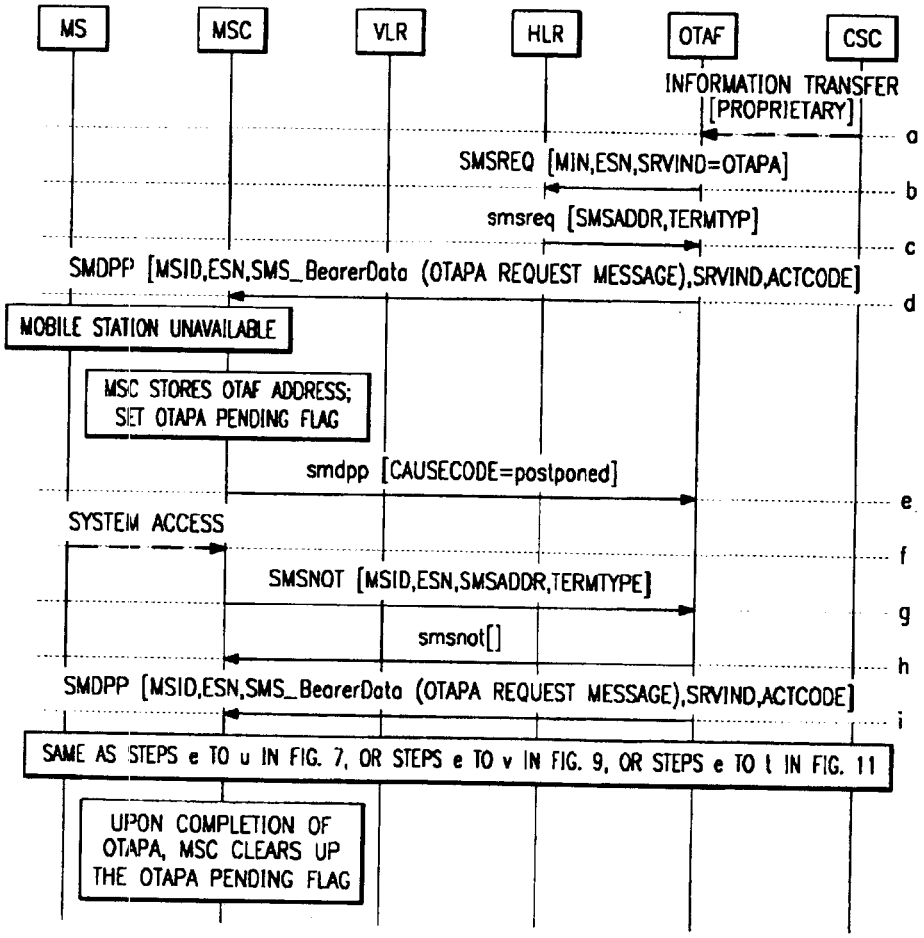
FIG. 16 illustrates, in a time sequence diagram form, a methodology implemented in accordance with a further embodiment of the present invention when a mobile station is unavailable.

The time sequence diagram of FIG. 16 presents a different approach to setting up an OTAPA pending flag in the MSC. As may be ascertained, in the approach used in this figure, the OTAF, after receiving the enablement message from the CSC, sends a request to the HLR. The HLR returns the appropriate information as to the address of the mobile station as most recently stored in the HLR OTAF then sends a message to the MSC. Rather than responding with an answer message as shown in previous FIG. 14, the MSC, in this embodiment, stores to the OTAF address sets the OTAPA pending flag and then sends a message back to the OTAF indicating that the OTAPA process has been postponed. In previous FIG. 14 the postponement message was not returned until after a timeout occurred. As indicated on line f of FIG. 16, system access is later attempted by the mobile station. At this time a notification message is returned to the OTAF entity from the MSC and OTAF completes the update process as illustrated in previous figures.

Figure 17:
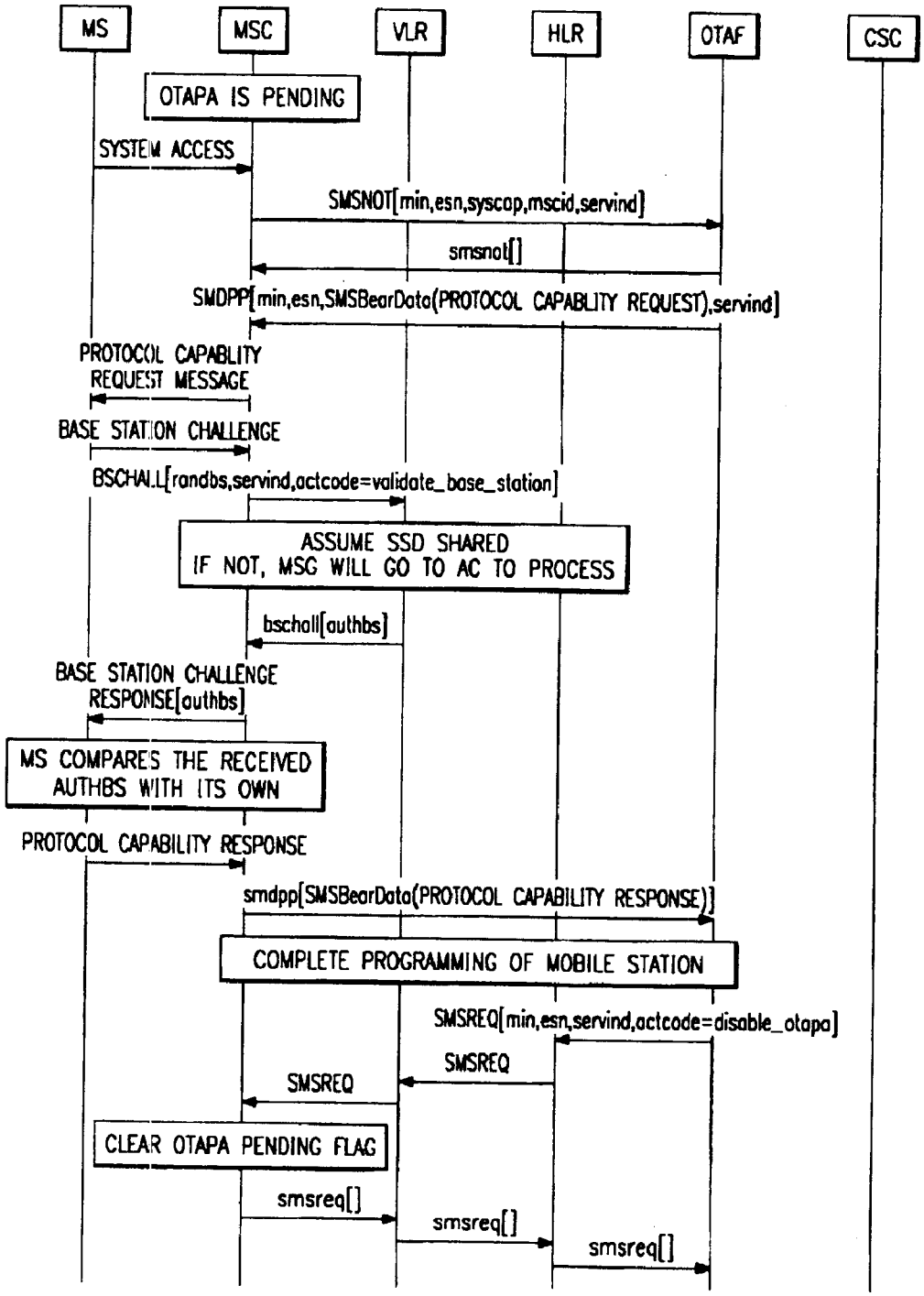
FIG. 17 illustrates, in a time sequence diagram form, a methodology implemented in accordance with one embodiment of the present invention when a mobile station accesses the system after an OTAPA flag has been set.

In FIG. 17, the time sequence diagram presentation illustrates the message passing solution to a situation where a flag has been set such as illustrated in the previous FIGS. 14–16. When a mobile station subsequently accesses the system as shown by the system access message from the mobile station to the MSC near the top of this figure, the MSC notes the flag and sends a notification to the OTAF that the mobile station is now available. The situation presented here may cause this process to be followed whether the mobile station access is for origination, termination or registration. Once the OTAF has replied to the MSC, the OTAPA process can proceed in the manner previously discussed in accordance with system parameters. In other words the system may do the updating with paging messages or with traffic messages and the entity completing the network validation process may be the visited network's VLR or the home AC. In any event the OTAPA pending flag is cleared from the MSC once the updating is completed.

Figure 18:
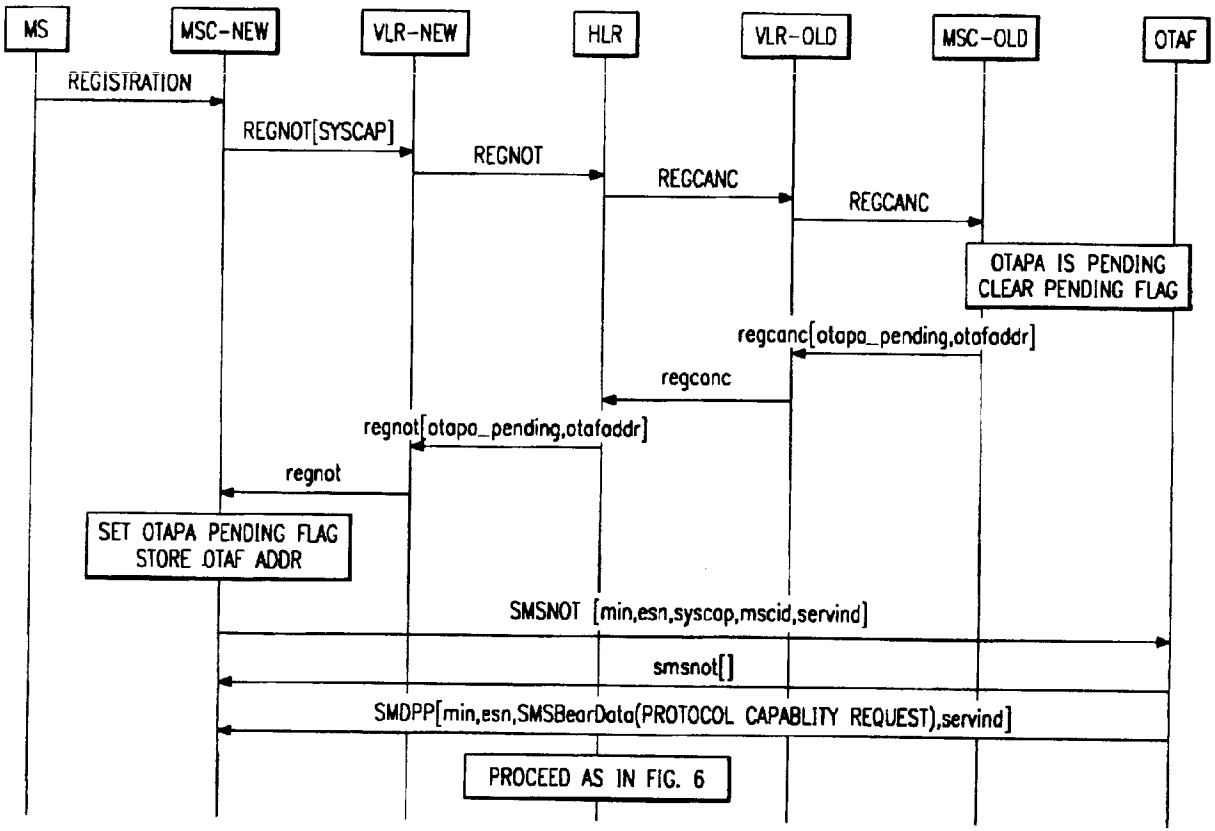
FIG. 18 illustrates, in a time sequence diagram form, a methodology implemented in accordance with one embodiment of the present invention where a mobile station roams between OTAPA capable systems after an OTAPA flag has been set.

In FIG. 18, the time sequence diagram presentation illustrates the messages involved where the mobile station has roamed between OTAPA capable systems and the OTAPA pending flag has been set in the MSC of a previously visited system. The initial contact of a mobile station with an MSC in a visited system causes a known process designated as registration. The MSC in the newly visited system sends a registration notification message to the VLR. Since the system is new to the MS, the VLR forwards the notification request to the home system and the message eventually gets to the HLR. When the HLR sends a registration cancellation message to the previously visited MSC, the reply to the HLR includes the information that the OTAPA process is pending. The old MSC clears the pending flag and the HLR notifies the new MSC that as part of the registration process it should set a OTAPA pending flag and store the OTAF address. Once it registration is completed, the new MSC notifies OTAF that the mobile station is available and at the appropriate time the OTAF sends a protocol capability request and the process continues as previously set forth in FIGS. 15 and 16.

Alternatively, the HLR may notify the OTAF with a SMS notification message when it receives the registration cancellation message from the previously visited MSC containing the OTAPA pending information. It is believed obvious to one skilled in the art that this variation could be practiced without providing a separate figure setting this sequence forth explicitly.

Figure 19:
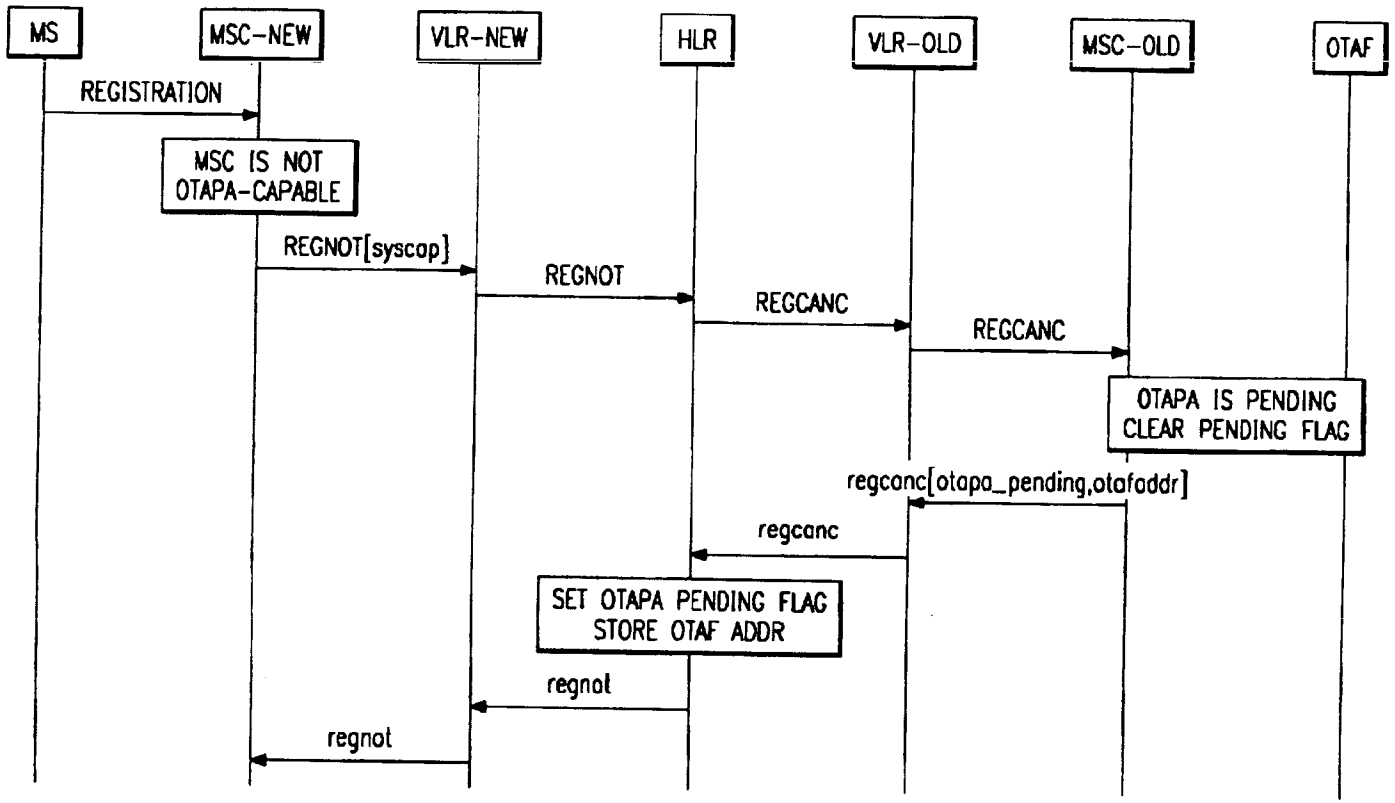
FIG. 19 illustrates, in a time sequence diagram form, a methodology implemented in accordance with one embodiment of the present invention where a mobile station roams into an OTAPA incapable systems after an OTAPA flag has been set.

The time sequence diagram of FIG. 19 addresses the situation where a mobile station roams into an OTAPA incapable system when the OTAPA pending flag has been set at the previously visited MSC. When the new MSC receives the registration message from the mobile station, it proceeds to notify the HLR as set forth in FIG. 18. The HLR will have stored information contained therein that the presently visited network is not OTAPA capable. Thus the OTAPA pending flag is stored in the HLR and the OTAF address is set and the registration notification reply is returned to the MSC. In the situation presented in the present figure, the system awaits the return of the mobile station to an OTAPA capable system before again attempting the OTAPA update process.

Figure 20:
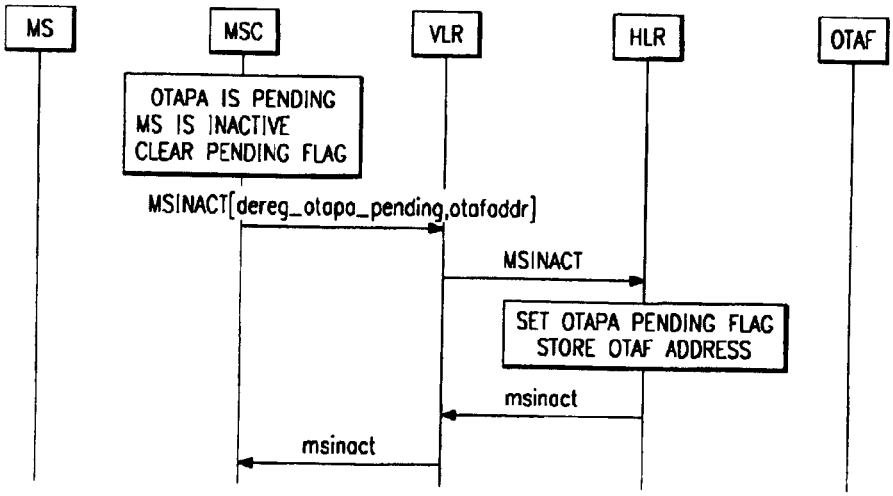
FIG. 20 illustrates, in a time sequence diagram form, a methodology implemented in accordance with one embodiment of the present invention where an MSC transfers an OTAPA pending flag to the HLR when a mobile station becomes inactive.

The time sequence diagram of FIG. 20 addresses the situation where the MSC makes a determination in accordance with pre-established parameters that the mobile station is no longer available to the MSC. This may be a timeout or may be due to other system defined parameters. In any event, the MSC sends a message to the HLR for the mobile station involved that the MSC is clearing its flags because of a determination that the mobile station is inactive. The messages sent from a MSC to the HLR causes an OTAPA pending flag to be set at the HLR and the OTAF address is stored as well. A message is then returned to the MSC indicating that the HLR has properly received the mobile station inactive message and accompanying data.

Figure 21:
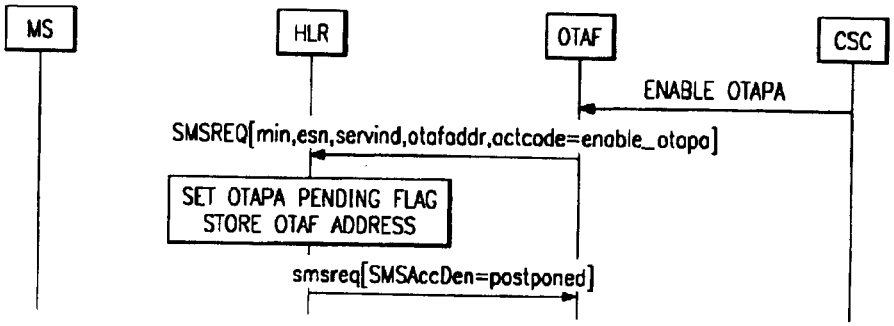
FIG. 21 illustrates, in a time sequence diagram form, a methodology implemented in accordance with one embodiment of the present invention where an HLR does not have the location information of a mobile station.

The time sequence diagram of FIG. 21 addresses the situation where the HLR does not have location information of the mobile that the HLR believes is correct. This typically happens when the mobile station has not registered with a network over a long period of time. In such a situation an OTAPA pending flag is the set in the HLR and the OTAF address is stored so that when the mobile station next accesses the network, the OTAF can be notified to again commence the OTAPA process.

Figure 22:
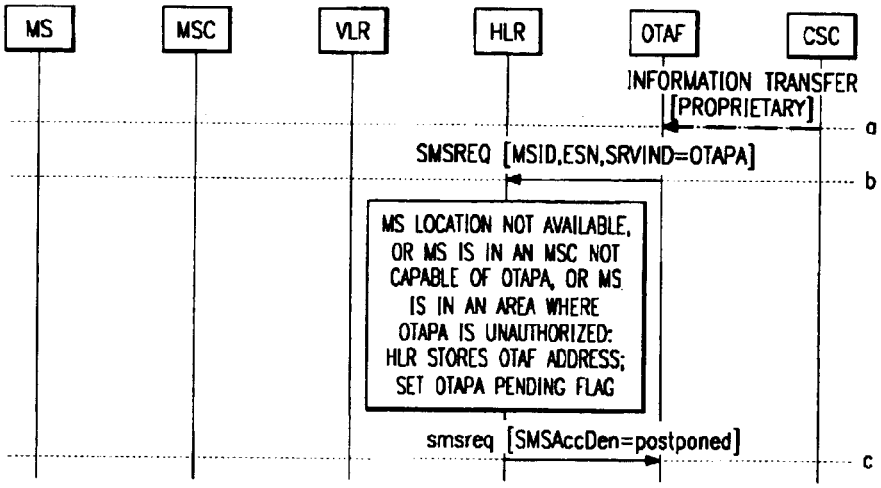
FIG. 22 illustrates, in a time sequence diagram form, a methodology implemented in accordance with a second embodiment of the present invention where an HLR does not have the location information of a mobile station.

The time sequence diagram of FIG. 22 is very similar to that of FIG. 21. As set forth in FIG. 22 there are reasons for returning a postponed message from the HLR to the OTAF in addition to those set forth in FIG. 21. Although obvious to one skilled in the art, FIG. 22 also uses a slightly different data nomenclature within the short message service request.

Figure 23:
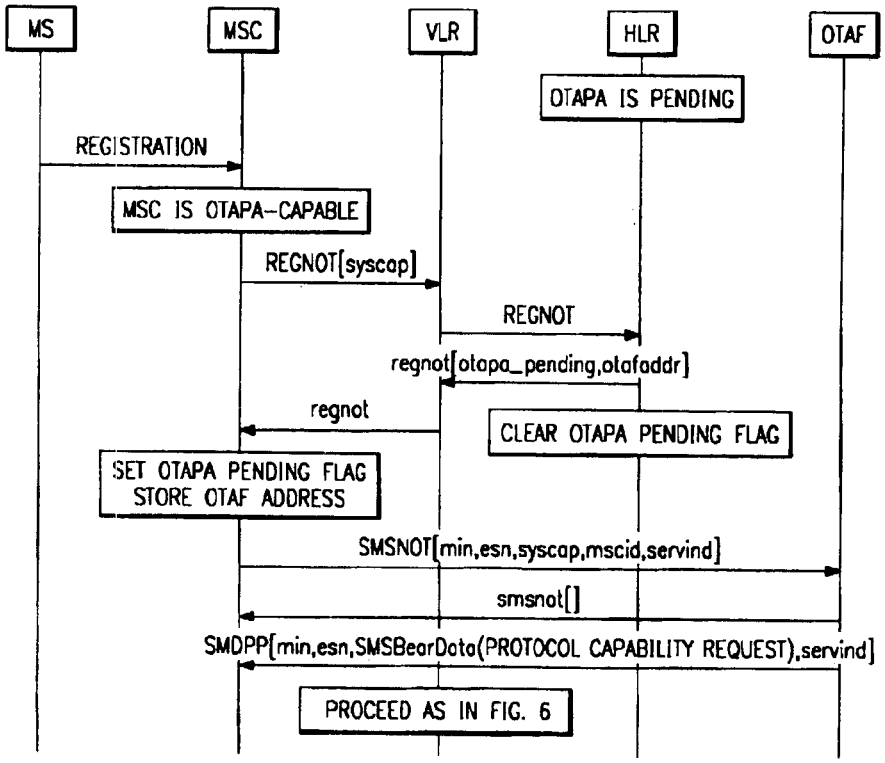
FIG. 23 illustrates, in a time sequence diagram form, a methodology implemented in accordance with one embodiment of the present invention where a mobile station registers after an OTAPA pending flag has been set at an HLR.

The time sequence diagram of FIG. 23 may be considered a continuation of the diagram of either FIGS. 21 or 22. Since the OTAPA pending flag has been set in the HLR as illustrated in each of the FIGS. 20–22, this will be observed to be the same situation as initially set forth in FIG. 23. Although the storage of the OTAF address is not specifically set forth in the presentation of FIG. 23, it is implied. When the visited MSC receives a registration request from the mobile station, a registration notification is sent from the MSC to the HLR if the visited MSC network is OTAPA capable. The OTAPA pending flag is cleared and a reply is returned to the MSC with the OTAF address and an OTAPA pending flag may be set at this time in the MSC. The OTAF is notified and a reply is returned to the MSC that OTAF has received the notification. The OTAF entity returns a protocol capability request to the MSC and the process proceeds as shown in the previously discussed figures such as those discussed in FIGS. 6 through 10. In other words, there will be a network validation, a service programming lock procedure and the update before clearing the various flags and registers.

Figure 24:
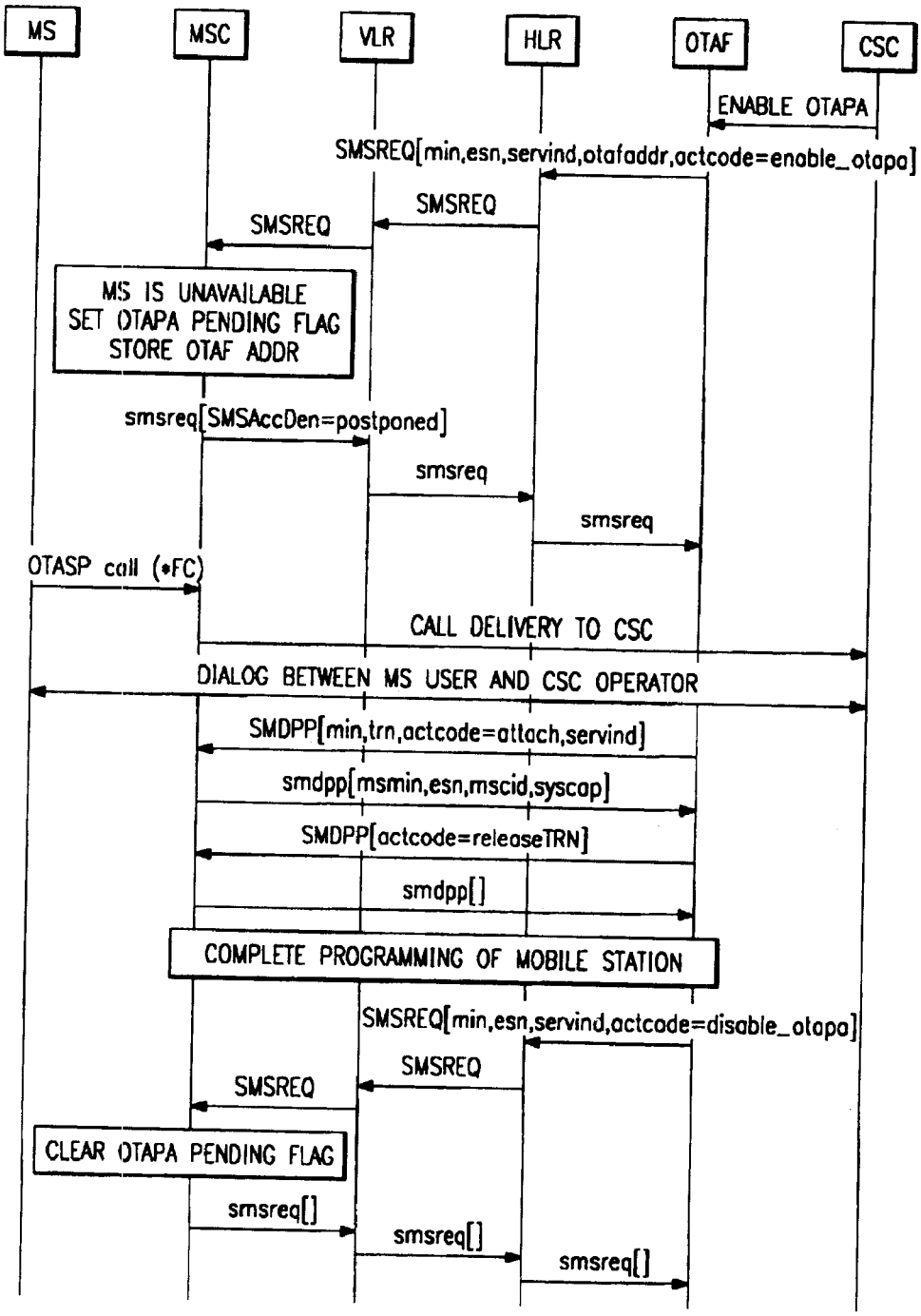
FIG. 24 illustrates, in a time sequence diagram form, a methodology implemented in accordance with one embodiment of the present invention where a OTASP call is initiated after an OTAPA pending flag has been set at an MSC.

The time sequence diagram of FIG. 24, addresses the situation where an OTAPA procedure has been attempted and a determination made that the mobile station is unavailable. As illustrated, the MSC has an OTAPA flag pending set and the OTAF address has been stored. It is now shown that an OTASP call is received for a user-initiated updating of the mobile station. Such a situation may occur due to the receipt by the user of a mailed or otherwise delivered communication that the mobile station needs to be updated to correctly operate in accordance with the user's desires. When an MSC receives an OTASP call with the OTAPA pending flag set, it delivers a message to the CSC of the mobile station. A set of messages listed as dialogue between the mobile station user and the CSC operator is set forth. As is illustrated at the bottom of this figure, the OTAF then sends a request to the MSC to clear the OTAPA pending flag. A reply to this request is sent from the MSC to the OTAF entity.

Figure 25:
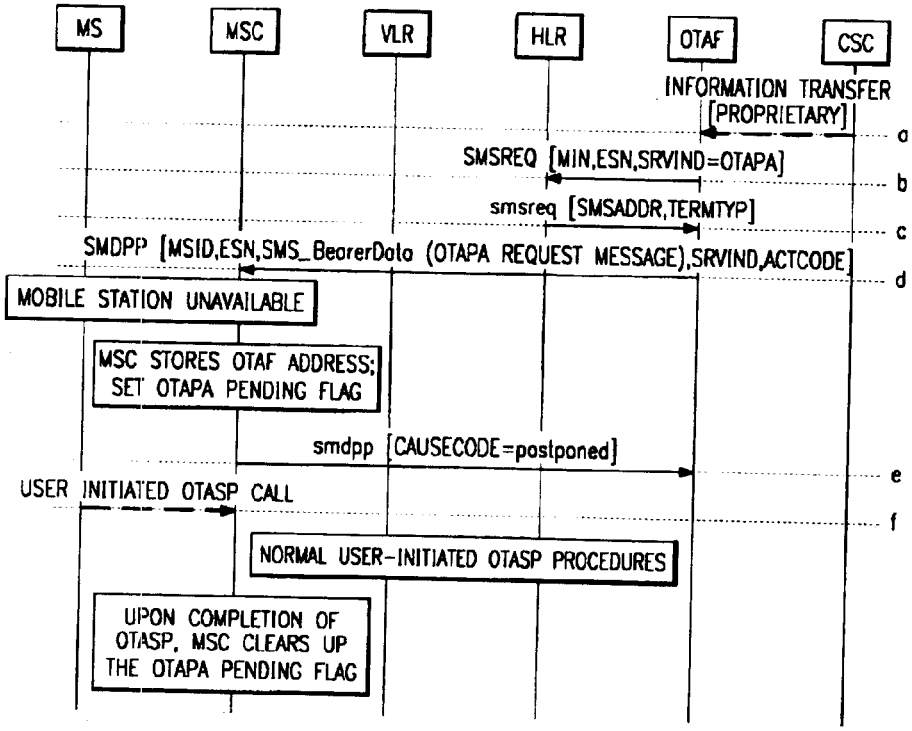
FIG. 25 illustrates, in a time sequence diagram form, a methodology implemented in accordance with a further embodiment of the present invention where an OTASP call is initiated after an OTAPA pending flag has been set at an MSC.

The time sequence diagram of FIG. 25 provides an alternate approach to the situation addressed in FIG. 24. The process as illustrated in FIG. 25 has the HLR return data to the OTAF which then proceeds to communicate directly with the MSC. When the MSC determines that the mobile station is unavailable, it stores the OTAF address, sets an OTAPA pending flag and returns a "postponed" message to OTAF. When a user initiated OTASP call is received by the MSC, normal user initiated OTASP procedures are followed as set forth in previous figures. Upon completion of the OTASP process, the MSC clears the OTAF address and clears the OTAPA pending flag. This action assumes that as part of OTASP programming, the programming that would have been performed by an OTAPA session was accomplished.

Figure 26:
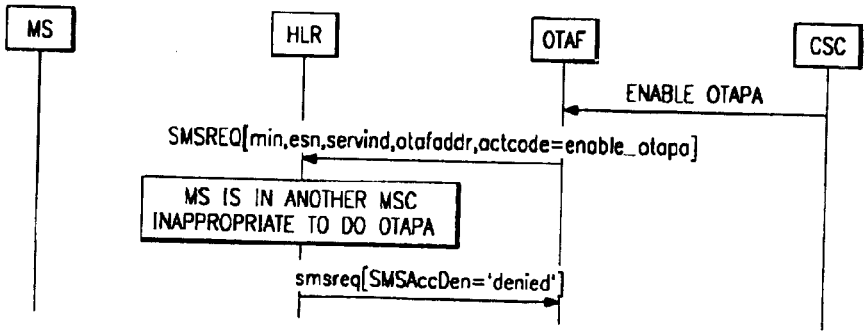
FIG. 26 illustrates, in a time sequence diagram form, a methodology implemented in accordance with one embodiment of the present invention where an OTAPA process is enabled while the mobile station is in a system where it is inappropriate to perform OTAPA.

The time sequence diagram of FIG. 26 addresses the situation where the HLR knows that the mobile station is in a network wherein it is inappropriate to do an OTAPA process. It may be that the visited network is not "trustworthy" or it may be that the visited system merely is not OTAPA capable. In any event the HLR sends a denied message to the OTAF entity. Although not shown, the HLR may set the OTAPA pending flag, store the OTAF address and return a postponement message to the OTAF entity. Such an alternate action will ensure that the OTAPA process will be performed at a later time when the mobile station is in an appropriate visited network or returns to the home network. This alternate action is shown in FIGS. 21 and 22.

Figure 27:
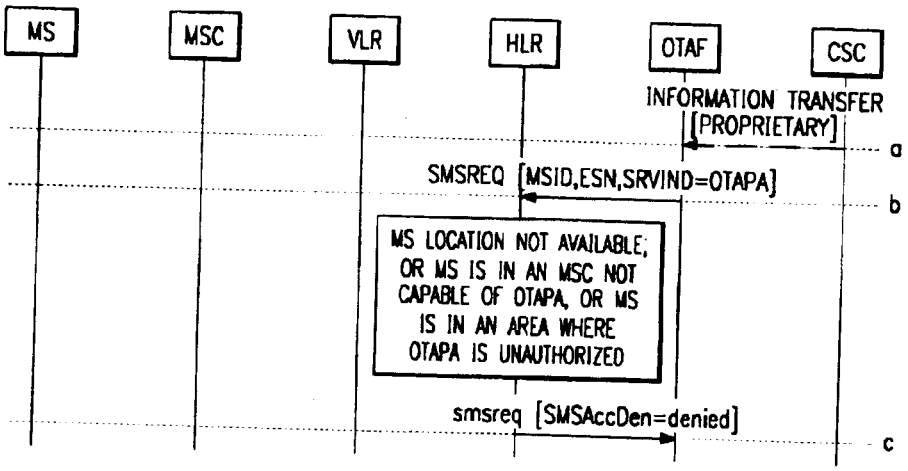
FIG. 27 illustrates, in a time sequence diagram form, a methodology implemented in accordance with a second embodiment of the present invention where an OTAPA process is enabled while the mobile station is in a system where it is inappropriate to perform OTAPA.

The time sequence diagram of FIG. 27 is very similar to that of FIG. 26 in a comparative manner similar to that of FIGS. 22 and 21. FIG. 27 uses slightly different nomenclature in defining the data used in the short message service request and further lists additional reasons for why the HLR would return a "denied" request to the OTAF. As presented, the mobile station location may not be available, the mobile station may be in a network not capable of OTAPA or the mobile station may be in an area where OTAPA is not authorized.

Figure 28:
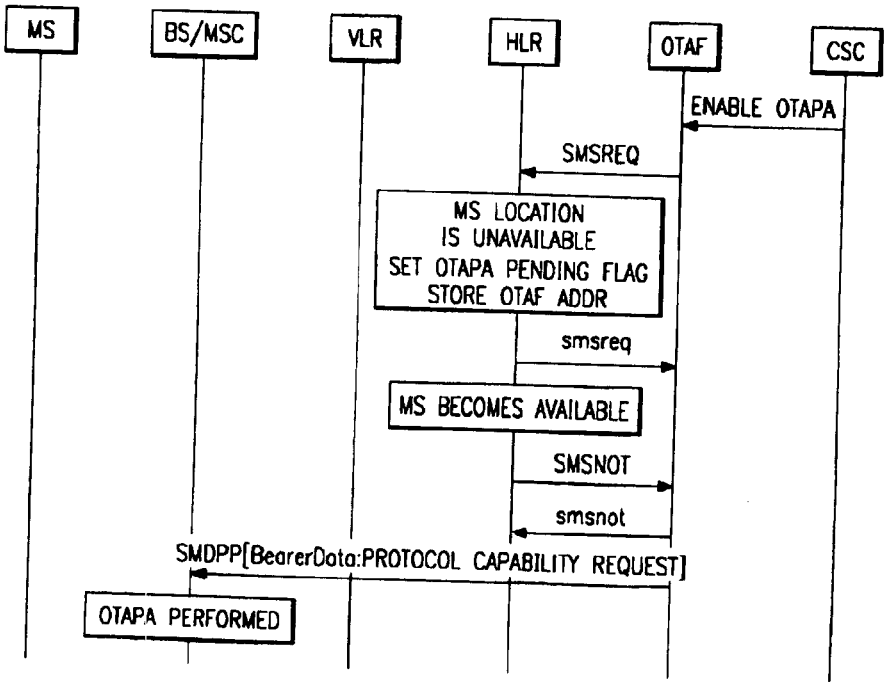
FIG. 28 illustrates, in a time sequence diagram form, a generalized methodology applied to the situation where an OTAPA process is enabled when the mobile station is in a situation where OTAPA cannot be performed at that time.

The time sequence diagram of FIG. 28 is a generalization of the actions taken in many previous figures such as FIGS. 21, 22, 26 and 27. Further the generalized approach could be used as a modification of other Figures such as 16 and 25 where the flag may advantageously be set in the HLR rather than in the MSC. As shown, once the MS becomes available after the flag is set, a notification is returned to the OTAF and an appropriate protocol capability request is issued by the OTAF. The OTAPA process is performed and upon completion of the process, the flag is cleared as shown in previous figures.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

In summary, the present invention permits a service operator or service provider to initiate the updating of a mobile subscribers terminal in an unobtrusive manner while still providing the security necessary to prevent unauthorized updating by other network providers or hackers. This process is designated herein as OTAPA. The updating may be initiated by sending a page to the mobile terminal or station. The page message includes a service option indication that lets the mobile station know that an updating procedure is to be performed. The mobile station also knows from the service option indication that it should not ring the user of the station. Thus the mobile terminal user is not unnecessarily disturbed.

Once the mobile station has been located, the remaining messages can be transmitted in a variety of formats depending upon the system used to complete the updating process and a general page broadcast may also be used. However, using a broadcast method is undesirable from a security standpoint and using the paging access channel typically will overburden this system resource. Many systems, such as CDMA, permit the multiplexing of signaling and voice messages on a given traffic channel. Thus, the preferred mode is to use the traffic channel whether or not the mobile station user is presently participating in a phone communication.

Subsequent to being notified by the network that an update procedure is to be initiated, the mobile station initiates a network validation scheme referred to herein as SPASM. SPASM uses portions of a previously used authentication scheme. In the SPASM process, the mobile station generates a random number which is combined with other internally stored information to produce a unique authorization word. The home network has a copy of this stored information. Typically this is stored in the AC and thus the network generates the same unique authorization word after receiving a copy of the random number generated within the mobile station. This network generated authorization word is returned to the mobile station where it is compared. Upon successful comparison, the mobile station performs a service lock process (actually an unlock process) and then performs the OTAPA update procedure.

While the SPASM process is not mandatory as a prerequisite to performing the OTAPA process, service providers in general want the security afforded the service provider by this validation process.

The concept presented in this document includes the use of flags set in the network when the OTAPA process cannot be completed for any of various reasons. These reasons include the situation where the mobile station cannot be located or is located in a visited network and it is impractical or undesirable to update the mobile station in that specific visited network. This flag may be located in the MSC or the HLR and it may need to be transferred to another MSC or to the HLR in certain situations.

It will thus be apparent that the present invention may be implemented in many different forms or embodiments in accordance with the desires of the service provider. In other words, some of the alternate embodiment's or portions of the overall concept are optional and may be practiced in various manners such as performing the OTAPA process using paging or traffic channels.

It should be noted that the description provided herein is but several examples of an implementation of the present invention. It should be noted that many additional implementations may also be utilized to realize the present invention.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

APPENDIX A

Terms and Definitions

AC. See Authentication Center.

Activation Code. A user-entered combination of a specified Feature Code (*FC) and defined group of at least two dialed digits (System Selection Code) that specify the user selection of a Band and a Block operated by the selected service provider.

A-key. A secret, 64-bit pattern stored in the mobile station and HLR/AC. It is used to generate/update the mobile stations Shared Secret Data.

Analog Voice Channel. An analog channel on which a voice conversation occurs and on which brief digital messages may be sent from a base station to a mobile station or from a mobile station to a base station.

Authentication. A procedure used by a base station to validate a mobile stations identity.

Authentication Center (AC). An entity that manages the authentication information related to the mobile station.

Base Station. A station in the Domestic Public Cellular Radio Telecommunications Service, other than a mobile station, used for communicating with mobile stations. Depending upon the context, the term base station may refer to a cell, a sector within a cell, an MSC, or other part of the cellular system. See also MSC.

CRC. See Cyclic Redundancy Code.

Cyclic Redundancy Code (CRC). A class of linear error detecting codes which generate parity check bits by finding the remainder of a polynomial division.

Electronic Serial Number (ESN). A 32-bit number assigned by the mobile station manufacturer, uniquely identifying the mobile station equipment.

ESN. See Electronic Serial Number.

Forward CDMA Channel. A CDMA Channel from a base station to mobile stations. The Forward CDMA Channel contains one or more code channels that are transmitted on a CDMA frequency assignment using a particular pilot PN offset. The code channels are associated with the Pilot Channel, Sync Channel, Paging Channels, and Traffic Channels. The Forward CDMA Channel always carries a Pilot Channel and may carry up to one Sync Channel, up to seven Paging Channels, and up to 63 Traffic Channels, as long as the total number of channels, including the Pilot Channel, is no greater than 64.

Forward Analog Voice Channel (FVC). An analog voice channel used from a base station to a mobile station.

Forward Traffic Channel. A code channel used to transport user and signaling traffic from the base station to the mobile station.

HLR. See Home Location Register.

Home Location Register (HLR). The location register to which a MIN/IMSI is assigned for record purposes such as subscriber information.

Home System. The cellular system in which the mobile station subscribes for service.

IMSI. See International Mobile Station Identity.

IMSI_M. MIN based IMSI using the lower 10-digits to store the MIN.

IMSI_T. IMSI not associated with MIN. Could be 15-digits or less.

International Mobile Station Identity (IMSI). A method of identifying stations in the land mobile service as specified in CCITT Recommendation E.212.

Long Code Mask. A 42-bit binary number that creates the unique identity of the long code. See also Public Long Code, Private Long Code, Public Long Code Mask, and Private Long Code Mask.

LSB. Least significant bit.

MCC. See Mobility Country Code.

MIN. See Mobile Identification Number.

MNC. See Mobile Network Code.

Mobile Country Code (MCC). A part of the E.212 IMSI identifying the home country. See CCITT Recommendation E.212.

MOBILE DIRECTORY NUMBER. A dialable directory number which is not necessarily the same as the mobile stations air interface identification, i.e., MIN, IMSI_M or IMSI_T.

Mobile Network Code (MNC). A part of the E.212 IMSI identifying the home network within the home country. See CCITT Recommendation E.212.

Mobile Station. A station in the Domestic Public Cellular Radio Telecommunications Service intended to be used while in motion or during halts at unspecified points. Mobile stations include portable untis (e.g., band-held personal units) and units installed in vehicles.

Mobile Identification Number (MIN). The 34-bit number that is a digital representation of the 10-digit number assigned to a mobile station.

Mobile Station Originated Call. A call originating from a mobile station.

Mobile Station Terminated Call. A call received by a mobile station (not to be confused with a disconnect or call release).

Mobile Subscriber or User. The person or entity using a mobile station.

Mobile Switching Center (MSC). A configuration of equipment that provides wireless radiotelephone service. Also called the Mobile Telephone Switching Office (MTSO).

MSB. Most significant bit.

MSC. See Mobile Switching Center.

NAM. See Number Assignment Module.

Network. A network is a subset of a cellular system, such as an area-wide cellular network, a private group of base stations, or a group of base stations set up to handle a special requirement. A network can be as small or as large as needed, as long as it is fully contained within a system. See also System.

Network Identification (NID). A number that uniquely identifies a network within a wireless system. See also System Identification.

NID. See Network Identification.

Number Assignment Module (NAM). A set of MIN/IMSI-related parameters stored in the mobile station.

OTAF. See Over-the-Air Functional Entity.

Over-the-Air Functional Entity (OTAF). A configuration of network equipment that controls OTASP functionality and messaging protocol.

OTAPA. See Over-the-Air Parameter Administration.

Over-the-Air Parameter Administration (OTAPA). Network initiated OTASP process of provisioning mobile station operational parameters over the air interface.

OTASP. See Over-the-Air Service Provisioning.

Over-the-Air Service Provisioning (OTASP). A process of provisioning mobile station operational parameters over the air interface.

Parity Check Bits. Bits added to a sequence of information bits to provide error detection, correction, or both.

Private Long Code. The long code characterized by the private long code mask.

Private Long Code Mask. The long code mask used to form the private long code. See also Public Long Code Mask and Long Code.

Public Long Code. The long code characterized by the public long code mask.

Public Long Code Mask. The long code mask used to form the public long code. The mask contains the ESN of the mobile station. See also Private Long Code Mask.

Release. A process that the mobile station and base station use to inform each other of call disconnect.

Reverse CDMA Channel. The CDMA Channel from the mobile station to the base station. From the base stations perspective, the Reverse CDMA Channel is the sum of all mobile station transmissions on a CDMA frequency assignment.

Roamer. A mobile station operating in a cellular system (or network) other than the one from which service was subscribed. See also Foreign NID Roamer and Foreign SID Roamer.

Service Option. A service capability of the system. Service options may be applications such as voice, data, or facsimile. See TSB58A, "Administration of Parameter Value Assignments for TIA/EIA Spread Spectrum Standards."

Service Programming Lock (SPL). A protection provided for preventing the over-the-air provisioning of certain mobile station parameters by unauthorized network entity by way of verifying the Service Programming Code (SPC).

Shared Secret Data (SSD). A 128-bit pattern stored in the mobile station (in semi-permanent memory) and known by the base station. SSD is a concatenation of two 64-bit subsets: SSD_A, which is used to support the authentication procedures, and SSD_B, which serves as one of the inputs to the process generating the encryption mask and private long code.

SID. See System Identification.

SPASM. See Subscriber Parameter Administration Security Mechanism.

Subscriber Parameter Administration Security Mechanism (SPASM). Security mechanism protecting parameters and indicators of active NAM from programming by an unauthorized network entity during the OTAPA session.

SPL. See Service Programming Lock.

SSD. See Shared Secret Data.

SSPR. See System Selection for Preferred Roaming.

System. A system is a cellular telephone service that covers a geographic area such as a city, metropolitan region, county, or group of counties. See also Network.

System Identification (SID). A number uniquely identifying a cellular system.

System Selection Code. A part of the Activation Code that specifies the user selection of a Band and a Block operated by the selected service provider.

System Selection for Preferred Roaming (SSPR). A feature that enhances the mobile station system acquisition process based on the set of additional parameters stored in the mobile station in the form of a Preferred Roaming List ($PR_LIST_{s\text{-}p}$).

Traffic Channel. A communication path between a mobile station and a base station used for user and signaling traffic. The term Traffic Channel implies a Forward Traffic Channel and Reverse Traffic Channel pair. See also Forward Traffic Channel and Reverse Traffic Channel.

Voice Channel. See Analog Voice Channel.

Voice Privacy. The process by which user voice transmitted over a CDMA Traffic Channel is afforded a modest degree of protection against eavesdropping over the air.

What is claimed is:

1. [A method of alerting a wireless communication network that an attempt to update operational parameter in a mobile station has failed comprising the steps of:] *The method of claim 7, further comprising:* setting a network based over-the-air parameter administration pending flag;

storing a network based over-the-air functional address for reinitiating the update process; and the over-the-air parameter administration pending flag is set in conjunction with home location register data when the location of a mobile station is not available.

2. The method of claim 1 wherein:

the over-the-air parameter administration pending flag is set in conjunction with MSC based data when an attempted update of a mobile station is not completed.

3. The method of claim 2 comprising the additional step of:

transferring the over-the-air parameter administration pending flag from a mobile switching center (MSC) to [a] *the* home location register (HLR) when it is not possible to update a mobile station due to mobile station inactivity or due to the inability of an MSC to update the mobile station.

4. The method of claim 2 comprising the additional step of:

transferring the flag indication to [an] *the home location register* (HLR) when a mobile station update is not completed within predetermined parameters.

5. [Apparatus for alerting a wireless communications network that an attempt to update operational parameters in a mobile station has failed comprising:] *The apparatus of claim 8, further comprising:* means for setting a network based over-the-air parameter administration pending flag;

means for storing a network based over-the-air functionality address for reinitiating the update process; and means for setting the over-the-air parameter administration pending flag in conjunction with home location register data when the location of a mobile station is not available.

6. The apparatus as claimed in claim 5 comprising in addition:

means for setting the over the air parameter administration pending flag in conjunction with MSC based data when an attempted update of an mobile station is not completed.

7. A method of validating a wireless communication network communicating with a mobile station comprising the steps of:

*initiating an over the air mobile station parameter administration session with a mobile station;* generating a first secret work, within [a] *the* mobile station, comprising a predetermined combination of a first word stored internal to the mobile station and a second word generated internal to said mobile station;

generating a second secret work, derived from data stored at [the] *a* home [location] network, comprising a predetermined combination of said second word obtained from said mobile station and a copy of said first word as obtained from a home location [network] register;

supplying said second secret word to said mobile station; [and]

comparing said first and second secret words within said mobile station to validate the communicating network*; and*

*when validation of the wireless communication network is successful, continuing with the over the over the air mobile station parameter administration session.*

8. Apparatus for validating a wireless communication network communicating with a mobile station comprising:

*means for initiating an over the air mobile station parameter administration session with a mobile station;* means for generating a first secret word, within [a] *the* mobile station, comprising a predetermined combination of a first word stored internal to the mobile station and a second word generated internal to said mobile station;

means for generating a second secret word, at [the] *a* home [location] network, comprising a predetermined combination of said second word received from said mobile station and a copy of said first word as obtained from a home location [network] register;

means for supplying said second secret word to said mobile station; [and]

means for comparing said first and second secret words within said mobile station to validate the communicating network*; and*

*means for, when validation of the wireless communication network is successful, continuing with the over the over the air mobile station parameter administration session.*

* * * * *